US008156030B2

(12) United States Patent
Damschroder et al.

(10) Patent No.: US 8,156,030 B2
(45) Date of Patent: Apr. 10, 2012

(54) DIVERSIFICATION MEASUREMENT AND ANALYSIS SYSTEM

(75) Inventors: James Eric Damschroder, Denver, CO (US); Josh Samuel Ladd, Knoxville, TN (US)

(73) Assignee: Gravity Investments LLC, Denver, CO (US)

( * ) Notice: Subject to any disclaimer, the term of this patent is extended or adjusted under 35 U.S.C. 154(b) by 221 days.

(21) Appl. No.: 12/417,713

(22) Filed: Apr. 3, 2009

(65) Prior Publication Data

US 2009/0292648 A1 Nov. 26, 2009

Related U.S. Application Data

(60) Provisional application No. 61/042,027, filed on Apr. 3, 2008.

(51) Int. Cl.
*G06Q 40/00* (2006.01)
(52) U.S. Cl. ............................ 705/36 R; 705/35; 705/38
(58) Field of Classification Search .............. 705/35–37, 705/38
See application file for complete search history.

(56) References Cited

U.S. PATENT DOCUMENTS

| | | |
|---|---|---|
| 4,953,085 A | 8/1990 | Atkins |
| 5,077,661 A | 12/1991 | Jain et al. |
| 5,148,365 A | 9/1992 | Dembo |
| 5,185,696 A | 2/1993 | Yoshino et al. |
| 5,220,500 A | 6/1993 | Baird et al. |
| 5,245,535 A | 9/1993 | Weiss et al. |
| 5,343,388 A | 8/1994 | Wedelin |
| 5,454,104 A | 9/1995 | Steidlmayer et al. |
| 5,644,727 A | 7/1997 | Atkins |
| 5,689,651 A | 11/1997 | Lozman |
| 5,704,045 A | 12/1997 | King et al. |
| 5,710,889 A | 1/1998 | Clark et al. |
| 5,729,700 A | 3/1998 | Melnikoff |
| 5,761,442 A | 6/1998 | Barr et al. |
| 5,774,881 A | 6/1998 | Friend et al. |
| 5,784,696 A | 7/1998 | Melnikoff |
| 5,794,224 A | 8/1998 | Yufik |

(Continued)

OTHER PUBLICATIONS

Christian L Dunis, & Gary Shannon. (2005). Emerging markets of South-East and Central Asia: Do they still offer a diversification benefit? Journal of Asset Management, 6(3), 168-190. Retrieved Nov. 11, 2011, from ABI/INFORM Global. (Document ID: 928531901).*

(Continued)

*Primary Examiner* — Alexander Kalinowski
*Assistant Examiner* — Abhishek Vyas
(74) *Attorney, Agent, or Firm* — Frost Brown Todd LLC; William S. Morriss

(57) ABSTRACT

This disclosure details methods for measuring and analyzing diversification of portfolio of assets. A dimension is a logical and quantitative means to measure diversification. As the number of dimensions increases so does diversification. Strong asset correlations among each other detract from the notion of independence. A positive correlation increases risks and is therefore undesirable. Assets are embedded into a high dimensional Euclidean vector space. The entire portfolio is interpreted as a set of points whose ambient dimension is the number of assets in the portfolio. The Karhunen-Loève expansion is used to quantify the KL dimension of the geometric object induced by a portfolio. The associated dimension is taken as the measure of diversification accounts for both the number of assets and the commonality within them. This ensures that measuring diversification as a dimension accounts for the complete diversification affect of the portfolio and is thus a valuable portfolio management tool.

11 Claims, 19 Drawing Sheets

U.S. PATENT DOCUMENTS

| | | | |
|---|---|---|---|
| 5,799,297 | A | 8/1998 | Goodridge et al. |
| 5,806,048 | A | 9/1998 | Kiron et al. |
| 5,806,049 | A | 9/1998 | Petruzzi |
| 5,812,987 | A | 9/1998 | Luskin et al. |
| 5,819,238 | A | 10/1998 | Fernholz |
| 5,848,425 | A | 12/1998 | Lawry et al. |
| 5,852,811 | A | 12/1998 | Atkins |
| 5,864,828 | A | 1/1999 | Atkins |
| 5,884,276 | A | 3/1999 | Zhu et al. |
| 5,884,285 | A | 3/1999 | Atkins |
| 5,884,287 | A | 3/1999 | Edesess |
| 5,918,217 | A | 6/1999 | Maggioncalda et al. |
| 5,930,774 | A | 7/1999 | Channault |
| 5,946,666 | A | 8/1999 | Nevo et al. |
| 5,991,743 | A | 11/1999 | Irving et al. |
| 5,991,793 | A | 11/1999 | Mukaida et al. |
| 5,999,918 | A | 12/1999 | Williams et al. |
| 6,003,018 | A | 12/1999 | Michaud et al. |
| 6,012,044 | A | 1/2000 | Maggioncalda et al. |
| 6,018,722 | A | 1/2000 | Ray et al. |
| 6,021,397 | A | 2/2000 | Jones et al. |
| 6,029,148 | A | 2/2000 | Zurstrassen |
| 6,032,123 | A | 2/2000 | Jameson |
| 6,055,517 | A | 4/2000 | Friend et al. |
| 6,058,377 | A | 5/2000 | Traub et al. |
| 6,078,903 | A | 6/2000 | Kealhofer |
| 6,078,904 | A | 6/2000 | Rebane |
| 6,078,905 | A | 6/2000 | Pich-LeWinter |
| 6,085,174 | A | 7/2000 | Edelman |
| 6,085,175 | A | 7/2000 | Gugel et al. |
| 6,085,216 | A | 7/2000 | Huberman et al. |
| 6,115,038 | A | 9/2000 | Christofferson et al. |
| 6,125,355 | A | 9/2000 | Bekaert et al. |
| 6,173,276 | B1 | 1/2001 | Kant et al. |
| 6,188,992 | B1 | 2/2001 | French |
| 6,219,649 | B1 | 4/2001 | Jameson |
| 6,240,399 | B1 | 5/2001 | Frank et al. |
| 6,275,814 | B1 | 8/2001 | Giansante et al. |
| 6,278,983 | B1 | 8/2001 | Ball |
| 6,282,520 | B1 | 8/2001 | Schirripa |
| 6,292,784 | B1 | 9/2001 | Martin et al. |
| 6,292,787 | B1 * | 9/2001 | Scott et al. ............... 705/36 R |
| 6,301,579 | B1 | 10/2001 | Becker |
| 6,360,263 | B1 | 3/2002 | Kurtzberg et al. |
| 6,374,227 | B1 | 4/2002 | Ye |
| 6,405,179 | B1 | 6/2002 | Rebane |
| 6,601,044 | B1 | 7/2003 | Wallman |
| 6,847,944 | B1 * | 1/2005 | Tosh et al. ............... 705/36 R |
| 7,062,458 | B2 | 6/2006 | Maggioncalda et al. |
| 7,305,362 | B2 * | 12/2007 | Weber et al. ............ 705/36 R |
| 7,328,182 | B1 * | 2/2008 | Yahil et al. ............... 705/36 R |
| 2002/0091605 | A1 | 7/2002 | Labe et al. |
| 2003/0088489 | A1 | 5/2003 | Peters et al. |
| 2004/0186814 | A1 * | 9/2004 | Chalermkraivuth et al. ... 706/16 |
| 2005/0187844 | A1 * | 8/2005 | Chalermkraivuth et al. ... 705/36 |
| 2005/0187847 | A1 * | 8/2005 | Bonissone et al. ............ 705/36 |

OTHER PUBLICATIONS

Poon, S. S., Taylor, S. J., & Ward, C. R. (1992). Portfolio Diversification: A Pictorial Analysis of the UK Stock Market. Journal of Business Finance & Accounting, 19(1), 87-101.*

Booth, David G., & Fama, Eugene F.. (1992). Diversification Returns and Asset Contributions. Financial Analysts Journal, 48(3), 26. Retrieved Nov. 11, 2011, from ABI/INFORM Global. (Document ID: 456859).*

Bebbington, A.C., "A Method of Bivariate Trimming for Robust Estimation of the Correlation Coefficient," Appl. Statist, vol. 27(3) (1978) pp. 221-226.

Best, M.J., et al., "The Efficient Set Mathematics When Mean-Variance Problems Are Subject to General Linear Constraints," Journal of Economics and Business, vol. 42(2) (1990) p. 105.

Butrimovitz, G., "Asset Allocation, portfolio optimization: Better risk-adjusted performance?," Journal of Financial Planning, vol. 12(7) (Aug. 1999) pp. 80-87.

Chan, L.K.C. et al., "On Portfolio Optimization: Forecasting Covariances and Choosing the Risk Model," Rev. of Financial Studies, Winter, vol. 12(5) (1999) pp. 937-974.

Cook, W. et al., "Eigen analysis of the stability and degree of information content in correlation matrices constructed from property time series data," Eur. Phys. J. B, vol. 27 (2002) pp. 189-195.

Dey, T.K. et al., "A Simple Provable Algorithm for Curve Reconstruction," members.tripod.com~GeomWiz. (Aug. 6, 1998) pp. 1-2.

Duan, J.C., "Cointegration: the new risk relationship." Mastering Risk, Financial Times, vol. 2, pp. 73-81.

Dupačová, J., "Portfolio optimization via stochastic programming: Methods of output analysis," Math. Meth. Oper. Res., vol. 50 (1999) pp. 245-270.

Emmer, S. et al., "Optimal Portfolios with Bounded Capital at Risk," Mathematical Finance, vol. 11(4) (Oct. 2001) pp. 365-384.

Haugen, R.A., "Estimating Portfolio Risk and Expected Return with Ad Hoc Factor Models," The Inefficient Stock Market, What Pays Off and Why, Prentice Hall, pp. 29-40.

Kassicieh, S.K. et al., "Investment Decisions Using Genetic Algorithms," IEEE 1060-3425/97 (1997) pp. 484-490.

Korn, R., "Continuous-Time Portfolio Optimization Under Terminal Wealth Constraints," Mathematical Methods of Operations Research, vol. 42 (1995) pp. 69-92.

Korn, R., Optimal Portfolios—Stochastic Models for Optimal Investment and Risk Management in Continuous Time, World Scientific, pp. 1-13, 34, 35.

Lederman, J. et al., "Taming Your Optimizer: A Guide through the Pitfalls of Mean-Variance Optimization," Global Asset Allocation—Techniques for Optimizing Portfolio Management, John Wiley & Sons, Inc., pp. 7-11.

"Make portfolio management four-dimensional," Gale Group Computer DB™ (Jul. 1992).

Markowitz, H.M., Portfolio Selection—Efficient Diversification of Investments, $2^{nd}$ Ed., Basil Blackwell, pp. 49-52, 82-86, 96-97, 99-105, 109-115, 129-143, 145-153, 187.

Marsili, M. et al., "Dynamical optimization theory of a diversified portfolio," Physica A, vol. 253 (1998) pp. 403-418.

"Mean Variance and Scenario-Based Approaches to Portfolio Selection," Journal of Portfolio Management, vol. 25(2) (1999) pp. 10-22.

Michaud, R.O., Efficient Asset Management—A Practical Guide to Stock Portfolio Optimization and Asset Allocation, Harvard Business School Press, pp. 1-16, 21-47, 55-56, 72-74, 77, 79, 133-137.

Pafka, S. et al., Noisy covariance matrices and portfolio optimization, Eur. Phys. J. B, vol. 27 (2002)pp. 277-280.

Sornette, D. et al., "$\varnothing^q$—Field Theory for Portfolio Optimization: "Fat Tails" and Non-Linear Correlations," Physics Reports, vol. 335 (2000) pp. 19-92.

Spence, J.G., "CML to SML: A Graphical Approach," The Financial Review, vol. 19(4) (1984) p. 388.

Steiner, M. et al., "Portfolio optimization with a neural network implementation of the coherent market hypothesis," Eur. Jour. of Operational Research, vol. 100 (1997) pp. 27-40.

Titterington, D.M., "Estimation of Correlation Coefficients by Ellipsoidal Trimming," Applied Statistics, vol. 27(3) (1978) pp. 227-234.

Vedarajan, G. et al., "Investment Portfolio Optimization using Genetic Algorithms," Genetic Programming 1997 Conference, Stanford University (1997) pp. 1-9.

"Visualing risk and correlation," Global Investor, vol. 124 (1999) pp. 42-43.

Zhou, X.Y. et al., "Continuous-Time Mean-Variance Portfolio Selection: A Stochastic LQ Framework," Appl. Math. Optim., vol. 42 (2000) pp. 19-33.

Zohar, G., "A Generalized Cameron-Martin Formula with Applications to Partially Observed Dynamic Portfolio Optimization," Mathematical Finance, vol. 11(4) (Oct. 2001) pp. 475-494.

Baele, L. et al., "Time-Varying Integration and International Diversification Strategies," Dept. of Finance, Tilburg U. and Ghent U. (Mar. 2007) pp. 1-53.

Brooks, R. et al., "International Diversification Strategies," Federal Reserve Bank of Atlanta, Working Paper 2002-23 (Nov. 2002) pp. 1-16.

Byrd, J., "Diversification: a broader perspective," Business Horizons (Mar.-Apr. 1997) pp. 1-6.

"Concentrated Portfolios: An Examination of Their Characteristics and Effectiveness," Brandes Institute (Sep. 2004) pp. 1-22.

Considine, G., "Accounting for Total Portfolio Diversification," Quantext, Inc. (2006) pp. 1-13.

Damschroder, J. et al., "Diversification Measurement," pp. 1-26.

Damschroder, J. E., "Diversification Optimization," Gravity Investments (Oct. 5, 2007) pp. 1-17.

Damschroder, J.E., "Diversification: The most important thing you forgot to measure," Gravity Investments, pp. 1-7.

Damschroder, J., "Risk Management or Diversification Management," (Aug. 18, 2006) pp. 1-4.

Damschroder, J., "Risk Management or Diversification Management," Gravity Management (Dec. 9, 2008) pp. 1-4.

Engle, R.F. et al., "Co-Integration and Error Correction: Representation, Estimation and Testing," Econometrica, vol. 55(2) (Mar. 1987) pp. 251-276.

French, C. et al., "Diversification and Persistence in Hedge Funds," Corbin Capital Partners, L.P. (Oct. 31, 2005) pp. 1-17.

Geometric Data Analysis: an Empirical Approach to Dimensionality Reduction and the Study of Patterns, John Wiley & Sons, Inc., New York, NY (2000) pp. 1-21 and 69-107.

Goetzmann, W.N. et al., "Equity Portfolio Diversification," School of Management, Yale University and Univ. of Texas, McCombs School of Business (Mar. 12, 2008) pp. 1-40.

Ibrazimov, R., "Portfolio Diversification and Value at Risk Under Thick-Tailedness," Dept. of Economics, Yale U. (Aug. 2005) pp. 1-23.

Kim, W.C. et al., Abstract of "Global Diversification Strategy and Corporate Profit Performance," Strategic Management Journal, vol. 10(1) (Jan.-Feb. 1989) pp. 45-57.

Ladd, J. et al., "A Geometric Approach to Portfolio Diversification," Dept. of Mathematics, Colorado State U. and Gravity Investments pp. 1-13.

Li, L., "An Economic Measure of Diversification Benefits," Yale School of Management, Yale ICF Working Paper No. 03-11 (Mar. 2003) pp. 1-41.

Riahi-Belkaoui, A., "Diversification Strategy as a Determinant of the Earnings Persistence of U.S. Multinational Firms," College of Business Administration, U. of Ill. at Chicago, pp. 1-22.

Statman, M. et al., "Correlation, return gaps and the benefit of diversification," Santa Clara University and Bellatore, Inc. (Nov. 2007) pp. 1-12.

Statman, M., "How Much Diversification is Enough?," http://ssrn.com/abstract=365241 (Feb. 25, 2003).

Tallman, S. et al., Abstract of "Effects of International Diversity and Product Diversity on the Performance of Multinational Firms," http://papers.ssrn.com/sol3/papers.cfm?abstract_id=1007170# (May 8, 2008).

"The Importance of Diversification," Allianz Global Investors, 1998 to 2007.

Tuzikov, A.V. et al., "Symmetry Measure Computation for Convex Polyhedra," J. of Math. Imaging and Vision, vol. 16 (2002) pp. 41-56.

\* cited by examiner

DIVERSIFICATION MEASUREMENT AND ANALYSIS SYSTEM

PRIORITY

This application claims priority from the disclosure of U.S. Provisional Patent Application Ser. No. 61/042,027, entitled "Diversification Measurement and Analysis System," filed Apr. 3, 2008, the disclosure of which is incorporated by reference herein in its entirety.

FIELD OF INVENTION

Embodiments of the invention concern software implemented systems, apparatuses, and methods in the field of investments and statistics.

BACKGROUND

Diversification is measured for portfolios of assets. Portfolios are modeled geometrically and the dimension of the induced geometry is taken as the diversification measurement.

The measurement of total diversification has been absent from the realm of investments and statistics. Diversification is thus left as an inconsistent and qualitatively applied analysis technique and is used implicitly in traditional optimization techniques as a risk mitigating control.

Diversification is a powerful tool that reduces the variance of a portfolio and consequently helps to stabilize performance, potentially enabling more consistent returns and mitigating risk. Diversification has also been shown to be a cornerstone of judging the prudence of a fiduciary.

Diversification is an investment attribute that generates great consensus as to its efficacy as a management attribute. Therefore, the utility of a robust and consistent measurement of diversification would be strong. Despite the widespread acceptance of diversification, investors suffer from the absence of a well-defined, uniform quantitative metric. In fact, investors are accustomed to thinking of diversification as only an abstract or qualitative attribute.

A statistical measurement of the relationship of assets is an indication of diversification. Yet, these relationships, traditionally co-variances or correlations, measure a unique relationship between any two single assets in the portfolio. Because the portfolio represents the entire composition of all these relationships, the measure of any one single relationship fails to represent a genuine level of portfolio diversification.

Another common misinterpretation of diversification is Beta. Beta is a measurement given to a portfolio that describes the amount of performance of that portfolio that can be explained by the market forces. While Beta can be construed as a measurement of diversification, it too has some limitations. Beta requires the presence of another portfolio external to that portfolio being measured. Conventionally, this portfolio may be the S&P 500 or other broad index. Beta thus has some utility for measuring the degree to which an asset will move with the market. This index is thus an approximation of the market.

Beta has several problems, in that defining the market is inherently problematic. In the United States alone, there are more than 200,000 investment products. No investment index can even come close to accounting for all of the different investment possibilities. Ultimately, every new IPO, every new start-up business and every new idea defines that market. No relative measure can ever capture the true market.

A further issue is that there is little efficacy in comparing the portfolio to the market. Beta is a relative measurement, whereas a measurement of diversification that would better help investors to construct and manage portfolios for performance purposes would not be concerned with items external to the portfolio but only those assets comprising the portfolio. Therefore, a holistic measurement of diversification that was independent of any market benchmark or index would be desirable by investors seeking better performance.

Investors care more about what happens to their portfolio than what the market does. Investors who have a sole focus on absolute returns are endeavoring to maximize the value of their portfolio. Such investors would prefer a holistic measurement of diversification than a measure that is relative to another (and essentially arbitrary) index.

Diversification has been primarily measured as to the number of assets held and to a lesser extent the largest allocations among those assets. Measuring diversification in this way fails to account for disparate weightings of assets and fails to account for the commonality of assets. To illustrate, consider a 10-asset portfolio consisting of ten equally weighted portfolios, having each asset perform identically to another asset. This portfolio has the overall performance of only one asset, despite holding ten different investments.

Traditional and commonly used statistics can provide some insight into diversification, but they fail to measure it. For example, measures of dispersion, central tendency and distribution are in one sense measures of diversification. Perhaps the most applicable among these measurements is the kurtosis. The kurtosis is a value reflecting how close observed values are to the mean of those values. The kurtosis is the fourth moment of a probability distribution and is therefore a dimensionless quantity. This measure also fails as a robust measurement of diversification in that it cannot account for the full dimensionality of the underlying data. In the conventional application, a portfolio manager would use the distribution and kurtosis to view the portfolio over time, and thus it does not provide any holistic insight.

Cluster analysis has some useful applications to help analyze diversification. However, cluster analysis fails to distill portfolio diversification to a singular value that may then be used to aid in the relative analysis of portfolios. Distilling portfolio diversification to one singular value is thus desirable to aid in investment analysis and selection, optimization, attribution and presentation of portfolios and assets.

Investors currently have no way of measuring diversification except for the Concentration co-Efficient (CC), Intra-Portfolio Correlation (IPC), and their derivates. A consistent, robust and quantitative diversification metric is thus of great utility to the industry.

Concentration Coefficient (CC)

The concentration coefficient (CC) measures portfolio concentration in terms of the asset weightings. In an equal weighted portfolio, the CC will be equal to the number of assets. As the portfolio becomes more concentrated in particular assets the CC will be proportionally reduced.

Thus, the Concentration Coefficient (CC) is defined as:

$$CC_t^P \equiv \left( \sum_{i=1}^{N} (w_{i,t}^P)^2 \right)^{-1}$$

P is the portfolio
N is the number of stocks held in the portfolio
$W_{i,t}$ is the weight of the $i^{th}$ stock in the portfolio at time t The concentration coefficient has the desirable property of being a discrete measurable quantity. However, it fails to account for the relationships of assets and thus is inadequate for managing diversification against market risk or systemic risk, which are among the most prevailing risks investors face, and need to be managed.

Intra-Portfolio Correlation (IPC)

Intra-portfolio correlation (IPC) is a means to quantify diversification. The range is from −1 to 1, with values approaching 1 being the least diversified. The IPC is a weighted average intra-portfolio correlation.

The Intra-Portfolio Correlation (IPC) statistic is calculated as follows:

$$IPC = \sum_i \sum_j X_i X_j p_{ij}$$

$X_i$ is the fraction invested in asset i
$X_j$ is the fraction invested in asset j
$P_{ij}$ is the correlation between assets i and j
The expression may be computed when i≠j The IPC is thus a measure of diversification against risks such as systemic risk but fails to account for other risks such as security risk, concentration risk and model risk.

Other Forms

Other forms of diversification analysis pertain to the classification of an asset such as depicting the sector or asset class assigned to portfolio assets. Classification schemas may be economic sectors, industries, valuation models or geographic locations. In addition, and especially within corporate portfolio models, elements may be product lines, the difference between these product lines in terms of elements such as price, characteristics of the targeted market, manufacturing style, goods or services, and materials used. Corporations also seek diversification for their investor base, supplier base, employee base, customer base. All such analysis techniques are qualitative, not quantitative.

While useful, this analysis fails to entirely account for diversification by subjugating analysis to only the studied elements, and again failing to provide a single measurement.

These techniques have additional drawbacks. They require categorization of all components. Frequently, the categorization of such assets lacks rigor and suffers from a non-optimal division. Additionally, there is no consistent process or categorization for determining asset classes, which portends a lack of consistency when describing the diversification attributes of various portfolios. Therefore characterizing diversification as having exposure to various asset classes results in inconsistent, non-comparable, and varying solutions.

A further element of subjectivity often results when mapping investments to categories. The inconsistent mapping process of various institutions map results in dissimilar diversification analyses.

These techniques fail to deliver one simple numerical value that an investor can use to analyze and compare portfolios. Therefore the result of the analysis is inadequate to compare statistically similar portfolios as the investor would have to analyze an array of values and most humans are incapable of accurately determining an optimal or even superior result, wherein if the result is reduced to one value, its comprehension and comparative efficacy increase dramatically.

Types of Diversification

For business strategy purposes, diversification is sometimes categorized as vertical, horizontal or concentric. In these conventional meanings, horizontal diversification is meant to mean broadening of the product line. Vertical diversification is the integration of the supply chain or distribution outlets and concentric diversification is a corporate growth strategy whereby a business builds its total sales by acquiring or establishing other unrelated businesses that may share management or technical efficiencies.

When the decision maker has a presumption of control, a diversification strategy can have several disadvantages. Namely as a corporation diversifies, fewer resources are able to be devoted to the same assets. This can diminish the ability for any one asset to reach a critical mass. A more microeconomic view may be that an asset with certain fixed and sunk costs may have a decreased or negative net present value when other assets supporting the continued development and sales of that asset are diluted by the new diversified strategy. One could imagine that certain efficiencies and advantages can be obtained by practicing the discipline of focus.

While the efficacy of maximizing diversification is not clear in corporate models, the utility of measuring diversification is clear. Accounting for diversification germane to a company provides the company with valuable information that when combined with business intelligence can shape strategy and execution. Product lines, target customers and business lines may be better optimized to increase diversification and decrease macroeconomic risks, or deliberately focused to exploit expected advantages. Shareholders of companies also stand to benefit from an internal diversification measurement; such values provide insight as to the focus, interrelationships and vulnerabilities of the company.

The only limitation towards the efficacy of investment portfolio diversification stems from a belief in the relative attractiveness of a particular asset. If other assets of comparable attractiveness cannot be discovered, then there is a reasonable justification for holding less diverse portfolios. This constraint is really rather a constraint upon the fund manager and the fund manger's resources including her own time for studying, analyzing and predicting returns on investments. As an investment manager's resources grow, the manager's ability to discover several highly attractive assets also increases and thus within a framework of rational participants and increasingly efficient markets the greater the importance of diversification in the investment policy and investment process. Without the ability to intelligently predict basic portfolio optimization input assumptions, any investors would be foolish to deliberately accept a portfolio of less diversification.

DEFINITIONS

Assets: Assets are typically financial assets, such as stocks, bonds, funds, futures, derivatives, cash-based assets, real estate. However, assets may also be resources. The manager may uniquely define resources. A corporation, for example, may define a resource as a person, department, opportunity, intellectual property, process, product or natural resource. Assets included the aforementioned financial assets, resources and statistical representations, derivatives, children or component therefore.

Portfolios: Portfolios are collections of assets. Assets may vary in weight within a portfolio. Portfolios may consist of assets that have allocation potential, but have no allocation. This scenario occurs when considering an asset's allocation. Sometimes assets do not merit an allocation. However, the act of considering an asset provides it as a member of the portfolio. Portfolios may include assets of different types. Portfolios may include collections of assets that vary over time.

Portfolios may be either real or hypothetical. Portfolios must have at least one asset, but are otherwise unlimited as to the number of assets they may contain.

Relationship: Normally, relationships of assets are given by statistical measures. Correlation, co-variance, vector angles and cosines, singular or principal component values, semi-correlations, co-integration, copulas, R-squared and regression lines are all measures of asset relationships. In addition to these known measurements of relationship other approximations, measurements or estimations may be substituted. Substitutions would possess the property that any value will measure the relative relationship of each asset, or potentially, each asset to an external benchmark or index. Relationships may constitute other quantifications of similarity, association, implication, proportion or relativity. Such relationships may also depict an alternative expectation, such as a conditional measurement. In addition to the conventional measures of relationship above, for simplicity, the definition is extended to include conventional time series. Such time series values may depict a score, price, return value, simulated value, statistic or ratio. This includes time series and series of return information conventional in finance. Such measurement may vary over time and probability and the measurements may be accounting for any value that is selected for which diversification will be measured. Relationship values may be mixed among assets. For example, some asset relationships may be built with a historical correlation, while other asset relationships in the same matrix may be built with a conditioned or estimated matrix. Relationships also include any derivative, subset, composite or estimation of any of the values obtained from the aforementioned methods.

Investor: This disclosure will also refer to an investor. An investor shall be taken to mean one who is allocating among assets, whether an individual, institution, group, business process or software application. Investors may also include representatives, agents, employees, fiduciaries and advisors to the investors. Any user of a software application that is utilizing the processes described herein will also be construed as an investor.

Eigenasset: An eigenasset is the index value of the KL energy spectrum. Eigenassets may also be interpreted as the singular values of the assets.

Dimension: Because we are measuring diversification as a dimension, it is useful to distinguish several types of dimensions. This distinction enables greater utility and precision.

Ambient Dimension The ambient dimension for a portfolio of N assets will be N. The ambient dimension is the initial vector space in which the data resides.

Intrinsic Dimension The smallest number of parameters required to model the data without loss. Intrinsic dimension is equivalent to the spanning dimension. Within the context of our portfolio analysis, the intrinsic dimension is less than or equal to the ambient dimension. Thus as the intrinsic dimension is more narrowly defined it creates a more precise diversification measurement tool.

Spanning Dimension The spanning dimension of the data is the standard definition for dimension in elementary linear algebra and indicates the minimum number of vectors required to span the data in the portfolio P. To formalize the definition consider the portfolio P consisting of |P|=m assets. Let XP be the data matrix whose j-th column is the j-th vector in the portfolio.

$$XP = [x1, x2 \ldots xm-1, xm] \quad (1)$$

The spanning dimension is formally equivalent to matrix rank (XP).

Karhunen-Loève Dimension (KLD): The KLD reveals a latent or "natural" dimensionality of the portfolio when projected in a vector space. The KLD is the dimension that is less than or equal to the intrinsic dimension. The KLD approximates the intrinsic dimension within a specified degree of accuracy measured in terms of a confidence interval. The KLD is the spanning dimension of a subspace containing most of the original portfolio data. The KLD approaches the intrinsic dimension, N, as the confidence interval (CI) approaches 0. Formally, KLD→N as CI→0

Karhunen-Loève (KL) expansion: KL expansion is used to reveal the approximate intrinsic dimension of the portfolio. The KL expansion is a generalization of a process also known by different names, depending on the discipline applied. References to any one algorithm shall be interpreted as applying any other equivalent algorithm. Other names for the process are Principal Component Analysis (PCA), Hotelling Analysis, Empirical Component Analysis, Quasiharmonic Modes, Proper Orthogonal Decomposition (POD), Empirical Eigenfunction Decomposition and Singular Value Decomposition (SVD). Irrespective of the name of the function, it is a process used to construct an optimal basis for a subspace generally used to reduce the dimensionality of a data set. While non-essential for the description of the invention, for completeness, the following theorem as well as some results follows.

Theorem 1

Singular Value Decomposition (SVD) Let A be a real valued m×n matrix and l=min(m,n). Then there exist orthogonal matrices U and V such that $$A = USV^T \quad (2),$$

such that U is an element of R(m×m), V is an element of R(n×n) and S=diag(s1, . . . , sn) is an element of R(m×n).

With the data matrix defined in (1) we define the temporal covariance matrix as $$Ct = XT^X \quad (3)$$

We also define the spatial covariance matrix as:

$$C_x = XX^T \quad (4)$$

Note that both matrices are symmetric and thus have a full set of orthonormal eigenvectors. The orthonormal eigenvectors are related to the left and right singular vectors contained in U, and V respectively in the following way.

Proposition 1.1

The m left singular vectors of X exist and are given by the m eigenvectors of Cx corresponding to nonzero eigenvalues. These eigenvalues correspond to the singular values squared.

Proposition 1.2

The n right singular vectors of X exist and are given by the n eigenvectors of Ct corresponding to nonzero eigenvalues. These eigenvalues correspond to the singular values squared.

Proposition 1.3

Suppose C is an N×N symmetric matrix with zero mean then the eigenvalues $\lambda i$ i=1, . . . , N are nonnegative.

Proposition 1.4

The eigenvectors of the spatial covariance matrix Cx are uncorrelated.

The above proposition is simply because the eigenvectors of a symmetric matrix are orthogonal.

Proposition 1.5

For mean-subtracted data, the statistical variance of the j-th coordinate direction is proportional to the j-th eigenvalue of C.

Proposition 1.6

Given a D term expansion in terms of the eigenbasis associated with C, the eigenvalues of C give a measurement of the truncation error:

$$\varepsilon mse = \sum_{j=D+1}^{N} \lambda_j \qquad (5)$$

Theorem 2

The basis defined by the spatial eigenvectors of Cx captures more statistical variance than any other basis.

With this theoretical framework in place, we are now able to define the energy of the dataset in terms of the statistical variance, or equivalently in terms of the singular values of the data.

The energy (EN) of the data set is defined as:

$$EN=\text{sum}(si), i=1,\ldots, N \qquad (6)$$

Thus, the energy captured by a D-term expansion (ED) is given by $$ED=\text{sum}(si), i=1,\ldots, D \qquad (7)$$

We may use the normalized energy defined as $$ED=ED/EN. \qquad (8)$$

We will refer to a plot of the singular values (also Eigenassets) versus the eigenvector index as a KL spectrum plot. It is often useful to plot si/EN so that we can see immediately the fraction of the total energy (or variance) contained in each eigendirection. These plots are used to estimate the so-called KL dimension. This dimension is generally taken as the number of terms required to ensure that some minimum quantity of energy is captured by the data.

The KL energy dimension (simply KL dimension), written dim(KLEγ), is defined to be the minimum number of terms $D_\gamma$ required in the orthogonal expansion to ensure that $ED_\gamma \geq \gamma$ Confidence Interval: the confidence interval is used to associate the KLD with a probabilistic measure of certainty. The confidence interval relates to the diversification measure as such; there is a 95% confidence level that the portfolio diversification is XX.X. Confidence intervals (CI) may be measured as intervals within a distribution of potential, real or hypothetical solutions. The KLD will approach the count of the intrinsic dimension as the CI→1. This is the standard interpretation of a confidence interval in statistics.

Conditioning Systems: Conditioning systems have the purpose and utility to create better expected values and may be useful for prediction. Additionally, conditioning systems may also have the purpose to gain additional diversification and performance insight under special conditions.

Many conditioning systems are well known in the field of finance, the more standard econometric methods include Bayesian estimations, multi-factor regressions, moving averages, Markov chains, smoothing, GARCH models, Multi-sampling, neural networks, interpolations and extrapolations. Such techniques are applied at various points at the investor's discretion. For example, a conditioning system may be applied to an input (time series, weight, relationship measure or confidence interval) or an output (visualization, metric, series of metrics or an entire database.)

KL diversification metric (KLDM): is defined as:

$$KLDM=D\gamma/\text{rank}(X). \qquad (13)$$

In other words, the KL diversification metric is the ratio of the KL energy dimension and the intrinsic (or spanning) dimension of the data. Perfect diversification (from the feasible set) is achieved if the KL energy dimension is equal to the intrinsic dimension of the data. The KLDM thus presents diversification as a range of values from 0 to 1. Values approaching 1 has greater diversification. Higher values also show that more assets inside the portfolio are contributing meaningful measures of diversification.

SUMMARY

We are measuring portfolio diversification as the number of dimensions that the portfolio resides in. Portfolios with more dimensions have more diversification. Lesser-diversified portfolios are contained in fewer dimensions.

For example, unless otherwise conditioned in a zero correlation example (with all correlations=0), the portfolio dimensionality may be equal to the number of assets in the portfolio (at least in the equally weighted scenario). As assets in a portfolio vary from zero correlation and tend towards −1 or 1 the portfolio dimensionality will decrease. In another extreme example (and again existing in an unconditioned state), a portfolio consisting of all assets with a perfect 1 or −1 correlation would have a dimensionality of 1.

To illustrate, consider FIG. 16, this may also be interpreted as having each asset be indistinguishable from one another. In this model, when all assets share a perfect 1 correlation with one another each assets is indistinguishable from any other asset and from a portfolio perspective, any one asset adds no more diversification than an hypothetical portfolio consisting of a singular asset. Just as a single point placed in a higher dimension, such as a point on a line the portfolio could move in only two directions. A point in 3 dimensions can move in more directions that are independent. Each additional dimension explains an additional level of independent performance. As such, a portfolio consisting of a number of independent performing assets will have a dimensionality equal to the number of assets.

Dimensions are inherently perpendicular or orthogonal to one another. For example, consider a two dimensional graph, the X and the Y dimensions are orthogonal (perpendicular) to one another. When the dimension is increased, it still holds that the third dimension is orthogonal to the other dimensions.

Dimensions greater than three lose much of the intuition, except for the 4th dimension which is often considered time. Indeed, in this sense, time is independent, uncorrelated or orthogonal to the three physical dimensions.

There is no mathematical limit to the number of dimensions and by representing a portfolio geometrically, we can place this portfolio into a vector space and calculate the proper dimensionality of the portfolio. The geometry of the portfolio is still valid, even if we lose our geometric intuition as the portfolio transcends into the abstract realm of higher dimensions.

In one preferred embodiment, measuring diversification comprises the following steps that may be executed in various orders. Please see FIG. 1 for a depiction of a possible interaction of the nine steps.

Step 1. Obtain or create a portfolio
Step 2. Apply any weighting to assets
Step 3. Obtain or create a relationship measure for the assets
Step 4. Obtain or create a confidence interval
Step 5. Apply any conditioning systems
Step 6. Model the data in a vector space
Step 7. Apply the Karhunen-Loève expansion process
Step 8. Calculate the Karhunen-Loève Dimension
Step 9. Publish the diversification value Conventional applications of the dimensional calculation techniques applied as the core process are predominately concerned with dimensional reduction. Such dimensional reduction techniques are standard in efficient image processing and decomposition, similar to speech recognition, the KL expansion is used to efficiently reduce and simplify large datasets. Here the utility is for size reduction and efficient electronic transmission. Dimension maximization is a rather novel concept, even applied to the fields in which dimensional reduction is common.

Dimensional maximization, quantification, attribution, optimization and analytics are unique to the field of management sciences and investments.

The dimensional quantification is also harmonic with a portfolio and its relative position to the outside world. For example, a portfolio of 15 dimensions would be tantamount to a portfolio influenced by 15 exogenous and independent factors. Therefore, an increase in the number of independent factors that could influence the portfolio decreases the potential for any one factor to cause significant harm. It is also possible to better understand and analyze a portfolio, even if the holdings are not known. For investment managers this is useful for reporting results to investors, regulators and risk managers without having to disclose the unique holdings. The investor benefits from having a holistic view of a portfolio and insights into diversification and risk.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings, in which like reference numerals identify the same elements and in which:

DETAILED DESCRIPTION OF THE INVENTION

Figure 1:
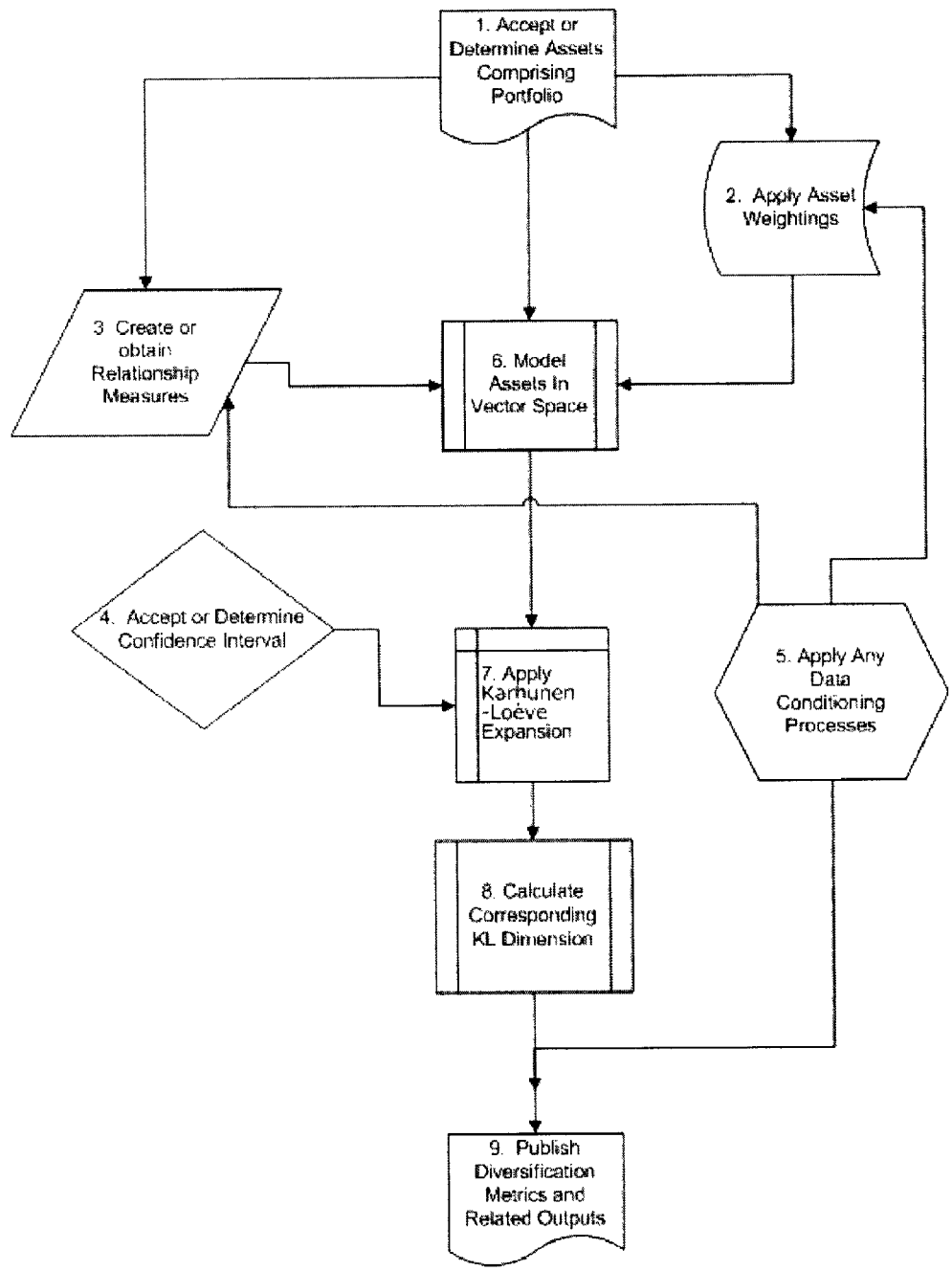
FIG. 1 shows a flowchart describing an exemplary process executed on a computer system.

The following description of certain examples should not be used to limit the scope of the present invention. Other examples, features, aspects, embodiments, and advantages of the invention will become apparent to those skilled in the art from the following description. As will be realized, the invention is capable of other different and obvious aspects, all without departing from the invention. Accordingly, the drawings and descriptions should be regarded as illustrative in nature and not restrictive.

The preferred embodiments of the invention can be implemented on one or more computer(s) and or one or more computer networks, such as a local area network (LAN), a wide area network (WAN), the Internet, personal computer or other device containing a sufficient processing resource.

In whole or in part, such a computer system contains various embodiments, such as one or more server(s), client computer(s), application computer(s) and/or other computer(s) can be utilized to implement embodiments of the invention. Illustrative computers can include, e.g.: a central processing unit; memory (e.g., RAM, etc.); digital data storage (e.g., hard drives, etc.); input/output ports, data entry devices (e.g., key boards, etc.); etc. The invention is designed but not limited to operation on a conventional computer system, however embodiments of the invention may be used on other processing devices such as servers, calculators, laptop computers and mobile devices such as PDAs.

Client computers may contain, in some embodiments, browser or similar software that can access the diversification metrics and embodiments. In other embodiments, the values are inputted to other systems or stored for archival or future retrieval.

In some preferred embodiments, the system utilizes relational databases, such as, e.g., employing a relational database management system to create, update and/or administer a relational database. Standard Query Language (SQL) statements entered by an investor or called by another application or process may create, update retrieve or manipulate diversification metrics contained within the database or file as well as the primary inputs to the diversification calculation.

Data in the system may originate in a flat file, database, random access memory, XML file or similarly formatted conduit. Time series or relationship data often originates from an exogenous system such as a financial data vendor or an exchange. Further, portfolio-weighting information can come from a custodian, brokerage or accounting system. Generally, conditioning systems and confidence intervals would be determined from an investor-designated process implemented with a keyboard, mouse or other machine human interface device, but it would also be possible for these values to be inherited from another exogenous system.

Output and output embodiments may be published to the same or different data storage and retrieval system. Such a system would be accessed by applications or other network and computer users. Publishing of the metrics may be directly displayed to a computer monitor or published to a database or webpage, thus configured as an input or display to a remote computer, document or display device.

Figure 19:
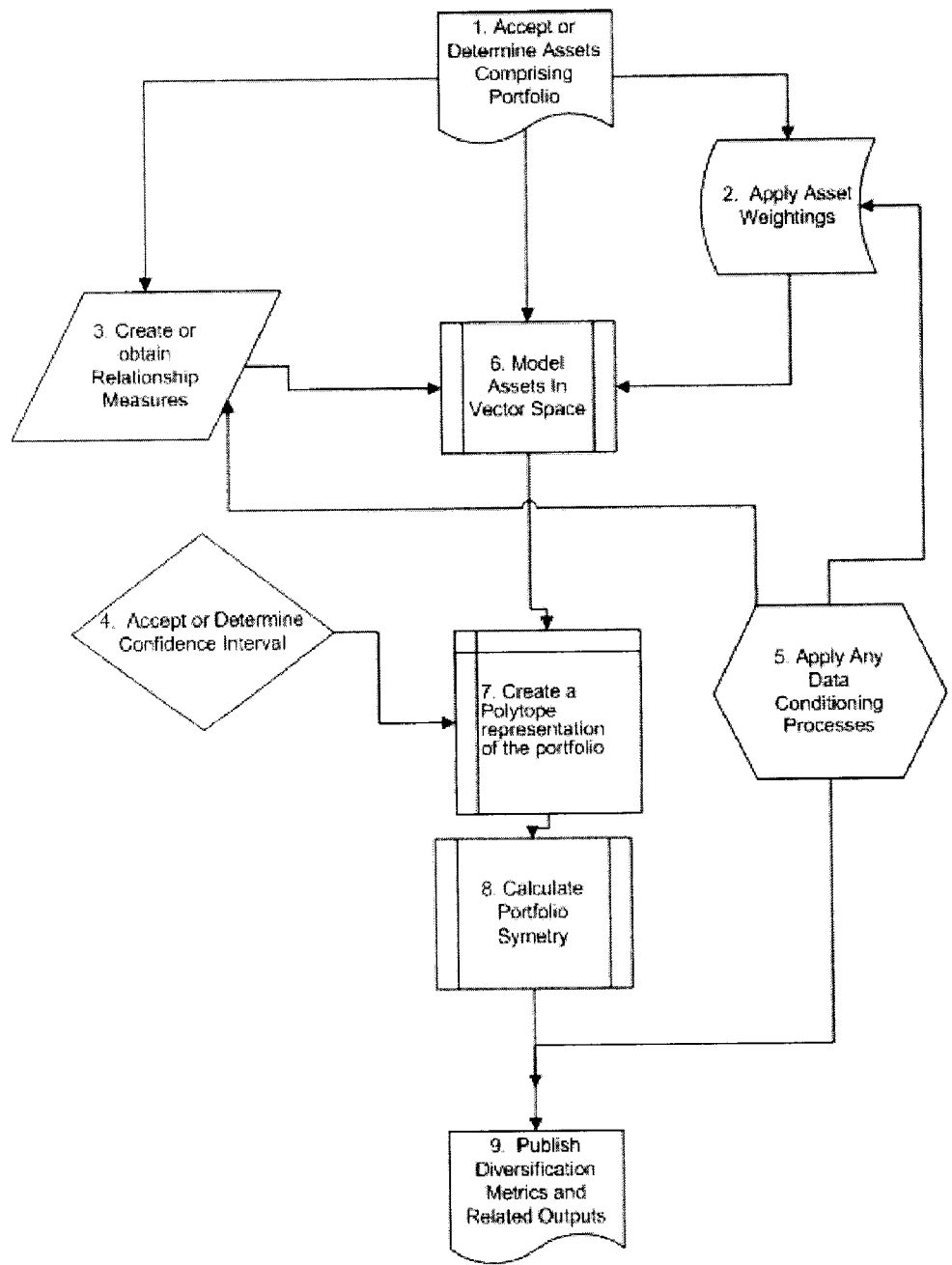
FIG. 19 shows a flow diagram for an exemplary process relating to analyzing the diversification of a portfolio.

An example of an embodiment of the invention executed on a computer is shown in FIG. 19.

Step 1. Obtain or Create a Portfolio

The invention is executed on a computer system that accepts a list or array of assets comprising the portfolio.

The collection of assets for a portfolio may stem from other systems such as a portfolio accounting system, broker dealer inventories, outputs of portfolio optimization or asset allocation programs, results of sorts and filters, index components, or other system collectively generating a portfolio.

Certain embodiments of this invention may be used recursively to produce the portfolio.

Step 2. Apply any Weighting to Assets

When an initial investment is not evenly distributed over all assets in a portfolio we say the portfolio is weighted. In this section, we introduce weighted portfolios.

In order to extend the geometric approach to weighted portfolios we need to understand how weighting a portfolio affects the geometry of the set P. Recall that in an equally weighted portfolio we normalize all asset vectors to have unit length, thus the SVD algorithm extracts only orientation information. In simple terms, all assets reside on the unit hyper sphere, the SVD extracts information about how the assets are distributed onto the sphere. When a portfolio is weighted, more value is assigned to a subset of the entire portfolio. Thus, the intrinsic dimension of the portfolio should resemble the intrinsic dimension of the subset. To cast this observation into a geometric frame, it makes sense to imagine that weighting an asset is equivalent to lengthening the vector an appropriate amount. Therefore, shifting the assets results in the centroid of the dataset moving in a direction favoring the weighted vectors and, in turn, the constrained optimization problem implicitly solved by the SVD will rotate the orthonormal eigenbasis in such a way as to minimize the projected residual of the weighted vector and will thus lean more heavily in the direction of the weighted asset(s). We say a set of vectors is orthonormal to mean, the vectors are mutually orthogonal (completely uncorrelated) and each vector has unit length (on the unit hypersphere). For example, if P is a perfectly diversified portfolio. Then after steps 1 and 2 of have been performed, the resulting set of vectors is orthonormal.

Equivalently, when the set of asset vectors in P are weighted the geometry of P changes in such a way that the KL dimension is altered by giving preference to particular directions in the ambient space.

$$W = [\omega 1\ \omega 2\ \ldots\ \omega m-1 \omega m] \qquad (14)$$

be a vector of weights for a portfolio of m assets where $$\mathrm{Sum}(\omega i) = 1,\ i = 1, \ldots, m. \qquad (15)$$

Then the weighted portfolio is represented with the weighted data matrix $$X\omega = [\omega 1 \times 1 \omega 2 \times 2 \ldots \omega m-1 \times m-1 \ldots \omega m \times m]. \qquad (16)$$

Geometrically, we have stretched the vector lengths in proportion to their concentration and contribution to the portfolio; however, we have not changed the orientation of assets and therefore have retained correlation information. The weighted portfolio has a different geometry than the equally weighted portfolio and again the SVD may be employed in the same way to probe the geometry of this set.

In the case of the weighted portfolio, whose data matrix $X\omega$ is defined in (16), the weighted temporal covariance matrix is defined as $$C\omega, t = (X\omega)TX\omega. \qquad (17)$$

Asset weights are obtained independent of the time series data, and thus a connection between $C\omega, t$ and $Ct$ is given. The symmetric m×m weights matrix SWM is shown in (18).

$$SWM = \begin{pmatrix} \omega_1^2 & \omega_1 \omega_2 & \ldots & \omega_1 \omega_m \\ \omega_2 \omega_1 & \omega_2^2 & \ldots & \omega_2 \omega_m \\ \vdots & \vdots & \ddots & \vdots \\ \omega_m \omega_1 & \omega_m \omega_2 & \ldots & \omega_m^2 \end{pmatrix} \qquad (18)$$

Then, $C\omega, t = CtSWM$ (19) where the  operator is defined as component wise multiplication As an alternative embodiment, step 4 may be replaced with an optimization process in which the array of asset weights were variables and the assets are moved within the vector space in a manner to engendering to minimize or maximize a fitness function, such as maximizing the dimensionality.

Weights of assets summing to over 1 (100%) are said to be leveraged portfolios. The diversification metrics can be calculated on the leveraged portfolio or notional portfolios.

Portfolio weights are accepted into the system for sources such as interface device like a keyboard or mouse, as well as obtained from an external system such as a portfolio accounting system, broker dealer inventories, outputs of portfolio optimization or asset allocation programs, results of sorts and filters, index components, or other system collectively generating a portfolio.

Default assumptions may be made with portfolios having no pre-defined weighting scheme.

It is another embodiment of the invention to overlay another allocation schema. Such overlays are common in finance and may include a currency overlay, options overlay, dynamic hedging strategies, tax overlay, allocation and trade size rounding overlay, trader or manager overlay or other overlay technique traditionally practiced in the art. Multiple overlays may be applied and overlays may be applied in conjunction with other systems. In the event that an overlay is applied, the diversification metrics may be published with and without the overlay to show the affect of the overlay program.

It is appropriate to measure diversification in harmony with the same level of management discretion, e.g. a decision to hire a manager who has ultimate authority of assets under management, that would be operated as if all the mangers holdings were one single asset.

Diversification metrics are calculated by combining the overlay with the portfolio and portfolio assets. In one embodiment, the system accepts an array of overlay weights corresponding to the portfolio assets and multiplies the time series of the assets by that of the normalized or mean subtracted overlay time series, thus obtaining a new relationship and weight matrix. In another embodiment, the overlay program diversification is separately calculated.

A further embodiment of the invention may allocate subsets of the portfolios to entities wishing to hedge, purchase, leverage or obtain exposure to a particular dimension. In such a case, the assets of the portfolios or portions thereof may be allocated to a particular dimension that most closely relates to a particular variable sought by the obtaining entity. Such an allocation is obtained by capturing the designated energy of an isolated dimension by the principal methods used in calculating the KL energy spectrum.

Step 3. Obtain or Create a Relationship Measure for the Assets.

Correlation may be the preferred relationship measure; however, other relationship measurements may also be utilized.

The relationship measure is equivalent whether built from time series data or correlations. The process for performing the calculations stemming from time series input follows.

Each asset in a portfolio P is represented as a time series consisting of n days of trading data. Let xi,j be the j-th observation of asset i where i=1, ..., |P| (|P| is the number of assets in the portfolio) and j=1, ..., n. For notational convenience, we will drop the superscript j corresponding to observation unless it is necessary to reference a particular observation. The time series may contain index values, percent change, or asset value. In any case, we embed each asset into Rn by treating each asset time series as an n dimensional vector. Thus, an entire portfolio of assets can be regarded as a set of points (vectors) contained in Rn, i.e. P is a subset of Rn. In this frame, we may bring to bear the full theoretical power of linear algebra. In particular, correlations amongst assets manifest themselves as well defined geometric structure in the algebraic set P. The placement of the assets in said capacity provides an ability to study the underlying geometry induced by a portfolio in order to quantify features of a portfolio.

In light of our representation of a time series as a vector, it is natural to define the norm of a time series of length $N$ using the standard two-norm definition from elementary linear algebra, denoted $\|x\|$, and defined as:

$$\|x\|2 = \text{sum}[(xj)^2], j=1, \ldots, N. \quad (2)$$

The mean value of a time series xk consisting of N observations is defined as:

$$<x> = 1/N^* \text{sum}(xk,j), j=1, \ldots, N. \quad (3)$$

It is standard practice to omit the vector time series index k for terms inside the bracket. It is also customary to mean subtract the time series and to work with the so-called caricature of the time series.

Definition:

The quantity $x' = xk - <x>$ is called the caricature, or fluctuating field of the time series xk.

Calculating relationship measures from correlations is a standard procedure detailed as follows.

Computing correlation matrices (or relations) from time series data is a routine procedure. To compute a correlation matrix from time series data:

1. For each time series $x_j$, corresponding to the jth asset in portfolio P, compute the caricature $\tilde{x}_j = x_j - <x_j>$.
2. Normalize each caricature $\tilde{x}_j = \tilde{x}_j / \|\tilde{x}_j\|$ so that $\|\tilde{x}_j\| = 1$. Geometrically, the portfolio is now characterized by a set of points on the unit hypersphere.

3. Form the data matrix $X = [\tilde{x}_1 \tilde{x}_2 \ldots \tilde{x}_{N-1} \tilde{x}_N]$ where $N = |P|$ (number of assets in portfolio P).

4. Compute the spatial covariance matrix $X^T X$. By construction, this is now a correlation matrix since the (i, j)th element of the matrix is $[X]_{i,j} = \tilde{x}_i^T \tilde{x}_j / (\|\tilde{x}_i\| \|\tilde{x}_j\|)$. When the time series have zero mean, as the caricatures do, then $[X]_{i,j}$ is the cross correlation (this is the precise definition of correlation found in nonlinear time series analysis and statistics) between time series i and j. Geometrically, this is the dot product of two unit vectors, which is equal to the cosine of the angle between the two vectors.

The size of each matrix may be a function of the number of investor-selected assets to be modeled. When an investor has selected N assets, each matrix has a size of N.times.N. The correlation matrix may be symmetric. A symmetric matrix here means that the elements of the upper right are identical to the matrix elements in the lower left. The diagonal separating the matrix is the correlation of each asset with respect to itself, and in this embodiment may be equal to one (1). The required inputs of the model may only require unique relationships. There is no limit on the number of assets that may be modeled using the present invention. N has no upper limit. There is no lower limit, but any portfolio must be comprised of at least 1 asset, such having a dimensionality of 1.

It is often the case that portfolio managers have access to correlation matrices as opposed to time series data. Alternatively, they have access to time series data; however, the data has asynchronous starting and end dates, may have missing values. Given this, it is necessary to make the connection between the two. Recall proposition 1.2 that states that the singular values of a data matrix X are equal to the square roots of the eigenvalues of the temporal covariance matrix $Ct = XTX$. In this frame, the temporal covariance matrix is precisely the correlation matrix in question.

Step 4. Obtain or Create a Confidence Interval

Note that this definition may utilize making a selection of rank. Rank selection processes can be made by arbitrary methods, such as 90%, 95% or 99%, representing popular confidence intervals used in statistics and some risk measurements. The rank selection can also be determined by examining the derivates of the relationship measures. For example, for a correlation of R, one or more data conditioning techniques such as resampling or taking rolling observations may be applied. From this data array, one embodiment calculates a standard deviation to ascertain the variability of the inputs. A ranking measurement can be then made relative to the underlying data variability. Rank selection may also be determined by portfolio objectives. For example, portfolios having imposed stringent constraints, such as asset liability ratios, time horizons or hurdle rates would have rank selection related to the imposing constraints.

Figure 16:
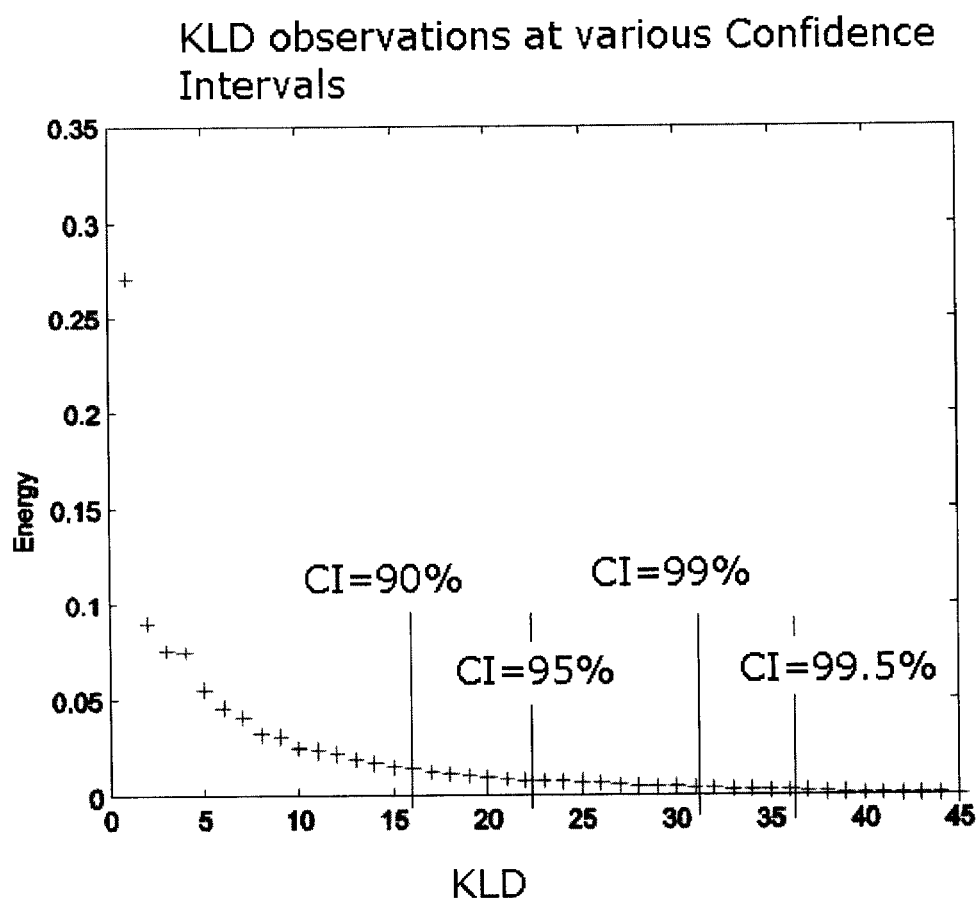
FIG. 16 shows the KL energy plot of eigenassets at various confidence levels.

FIG. 16 shows various confidence levels associated with a KL energy spectrum. The confidence interval of 90% corresponds to 16 dimensions. CI=95% corresponds to 22 dimensions. CI=99% corresponds to 31 Dimensions. Finally CI=99.5% corresponds to 36 dimensions.

Confidence intervals can be determined by investor input using machine interface devices such as keyboards and pointing device. CI may also be given by another system, or omitted for certain embodiments not requiring the single KLD value.

In addition to inputting confidence intervals determined by the solution quality of other optimizations, confidence intervals may also be measured versus benchmarks. Benchmarks may be reflecting actual or hypothetical performance of known portfolios. The tracking error of a portfolio juxtapose its benchmark may qualify as a given confidence interval.

Managers with an edict to track a benchmark within a specified level of tracking error could infer a confidence interval relative to the level of tracking error.

The dimensionality of the original matrix can be reduced using any optimization technique including a genetic optimization such as the Technique described in Damschroder U.S. Pat. No. 7,472,084 the optimization reduces the dimensionality while simultaneously accumulating an error allowance that is the subject of a error minimizing fitness function.

The total error value reflects the difference between the sum of errors or squared errors of the relationship matrix and the vector cosine matrix.

The optimization engenders to minimize the fitness function that is equal to the sum of all errors. This is an error minimization functions.

The magnitude of the error expressed as a fraction of the total potential error gives a fraction that becomes the basis for a confidence interval. This fraction could first be amended to reflect population sizes, derivatives of the matrix of its values, or results of external or ancillary equations.

Step 5. Apply any Conditioning Systems

The core process can be subject to a variety of conditioning systems.

Data conditioning may take place at one discrete step, or may actually occur at one or more steps in the system. At any point that an intermediate value is obtained or created such a values or series of values may be affected by applying a conditioning system.

Conditioning systems typically represent stored routines executed on a computer processor that apply to measurement inputs and outputs.

In addition to calculating relationship measures on the asset directly, sometimes it can be advantageous to measure diversification only as it pertain to one element of analysis (e.g., Factor.) For this purpose, the relationship measure(s) can be applied to elements in common for portfolio assets. For example, to analyze diversification solely as it pertains to international exposure one can isolate these elements and analyze only those parts. Traditional methods can be used to isolate such elements, such as principal component analysis, allocation weights or attribution exposures for common statistics such as risk or return.

This method may be applied to either the total exposure to an element of analysis; such as one country among an array of potential countries or it can be applied per asset by combining the asset with asset weights and the elements and element weights.

Correlations or other relationship measures may be normalized to account for negative correlations. A negative correlation takes the values between zero and −1. Such relationships move at least partially in opposition to one another. In the core process, large negative values are considered deterministic and would adversely affect the total portfolio diversification, at least relative to a non-correlated asset. However, for investment managers the impact of negative correlation values on total diversification may be subjective.

To assume that negatively correlated assets increase diversification a manager would be assuming, or otherwise applying the idea that there would be some uncoupling between the assets expected prices, otherwise positive returns from one asset would be negated by an equal negative movement from it's counterpart. This is an assumption that some managers feel comfortable making while another manager may not. To enable the investor who is comfortable predicting the divergence of the historical values, they may be able to achieve greater diversification by using negatively correlated assets.

A correlation value may be conditioned to reflect this disposition with the following operation:

=(1+Correlation)/2

The result of which could be further conditioned so that the result would be fairly comparable to unconditioned values. This could be calculated by a normalization function.

This embodiment has an additional characteristic in that the assets having a significant, but negative relationship with one another are may summarily be characterized as a zero correlation.

Such techniques can also be a conditional filter, based on the measurement, trend, value, or derivative of one or more economic variables. For example, it could be desirable to measurement diversification for a portfolio during periods of historically high inflation rates. In such case, relationship data could be filtered to those periods of history specifically matching the filter.

Another conditioning system would involve combining relationship measures of varying sampling frequencies. The weightings of such calculations can be based on the uncertainty of the future horizon for which we are creating the analysis or measurement. Consider the circumstance where an investor's intended holding period was one year, plus or minus three months. We can combine one sample of relationship measures based on a price time series with a second sample based on a return series. The return series and the weight of the sample would be proportional to the certainty of the time horizon. In this example, the investor would have a minimum time horizon of nine months and a maximum time horizon of 15 months. This range of six months is expressed as a sample weight relative to the expected time horizon. Therefore, in this example the investor would weigh the return-based series 50% of the price-based series. The result provides a relationship measure that is relative to the future and the future uncertainty.

Diversification metrics may be built on a single period, multi-period, or amalgamation of such periods. Periods may correspond to other variables besides time, such as probability, or similar sort order.

The measurements of diversification may be affected by a variety of statistical processes which may occur at various times in the construction of the metrics. Simulation, re-sampling, extrapolation: each may occur with the asset time series, relationship measurement, dimensional reduction process and confidence interval determination. Alternatively, simulations may be applied ex post to the results of the dimensional measurement and publishing process.

Step 6. Model the Data in a Vector Space

To model the data as required for calculations, all the input data is collected and the data can be interpreted as being placed in a vector space. Implementations of this step are often automatic provided that the dimension calculation algorithms executed on computer processors interpret the data in a geometric fashion. Other algorithms may require the asset weightings to be combined with the relationship measures to enable the geometric interpretation.

a. Compute the symmetric weights matrix SWM.
b. Compute the weighted temporal relationship matrix $C\omega,t$.
c. Compute the eigenvalues $\lambda i$ of $C\omega,t$ Step 7. Apply the KL Expansion Process From the following steps, we have assembled the necessary inputs to compute the KL energy spectrum.

d. Compute sqrt($\lambda i$) for every i, these are the singular values of the unknown data matrix $X\omega$.

In the preferred embodiment, the inputs are obtained from a computer random access memory and a computer processor executes a routine containing the Karhunen-Loève or equivalent algorithm as described in the definition for Karhunen-Loève (KL) expansion.

This process creates an output containing a series of eigenassets (also know as the singular values) This output is stored in a computer readable media and passed to step 8.

Step 8. Calculate the Karhunen-Loève Dimension

The KL dimension is then given by the associated rank of the assets corresponding to the inputted confidence interval. If the spectrum is continuous, then the KL dimension calculation is provided by integrating the spectrum up to the confidence interval.

The result of the KL expansion are associated with the confidence interval. In one embodiment, a calculation is executed on a computer processor that accepts the output of the KL energy spectrum as well as accepts the CI. The algorithm simply counts the eigenassets ordered from greatest to least and returns the value most closely associated with the confidence interval. Other variations include returning the last counted value prior to reaching the sum determined by the CI.

As an example, in a 100 asset portfolio, the sum of the first 65 eigenassets equals 94.5% of the total energy. If the inclusion of the $66^{th}$ ranked eigenasset would cause the total energy to sum to 95.3, the algorithm would stop at 65 and return a KLD=65 provided a CI=95%.

The KL energy spectrum can be interpreted as either a discrete spectrum or continuous spectrum. In the discrete case, the KLD is computed by summation, and in the continuous case, the KLD is computed by integration. This enables fractional KLD measurements. Fractional KLD metrics are especially useful in low dimension portfolios.

To transform a discrete KL spectrum one would only need to apply an interpolation scheme to the spectrum.

As an alternative embodiment, steps 7 and 8 can be replaced by the two symmetry quantification methods described below.

A second method is provided for the diversification measurement process wherein the amount of diversification is a function of the degree in which a portfolio is symmetrical. The portfolio is projected into a vector space by mapping vectors cosines to correlations. The shape of the portfolio can be determined by methods disclosed in U.S. Pat. No. 7,472,084, which is incorporated herein by reference.

Another embodiment places the assets in a vector space. Vectors are mapped by equating the direction from the origin. Correlations of assets are mapped to cosines of the vectors. Vector lengths are given by an investor defined utility function.

With the polytope determined, one can understand diversification by measuring the shape of the portfolio to a model of perfect symmetry. This measurement is known as sphericty. Sphericty measures the volume to surface area ratio of a polyhedron or polytope.

The computation may be taken as:

The hyperdimensional volume of the space which a (n–1)-sphere encloses (the n-ball) is given by $$V_n = \frac{\pi^{\frac{n}{2}} R^n}{\Gamma(\frac{n}{2}+1)} = C_n R^n$$

where $\Gamma$ is the gamma function. (For even n, $$\Gamma\left(\frac{n}{2}+1\right) = \left(\frac{n}{2}\right)!$$

for odd n, $$\Gamma\left(\frac{n}{2}+1\right) + \sqrt{\pi} \, \frac{n!!}{2^{(n+1)/2}},$$

where n!! denotes the double factorial.

From this, it follows that the value of the constant Cn for a given n is:

$$C_n = \frac{\pi^r}{r!},$$

for even n such that n=2r, and $$C_n = \frac{2^{(n+1)/2} \pi^{(n-1)/2}}{n!!},$$

for odd n.

The "surface area" of this (n–1)-sphere is $$S_n = \frac{dV_n}{dR} = \frac{nV_n}{R} = \frac{2\pi^{\frac{n}{2}} R^{n-1}}{\Gamma(\frac{n}{2})} = nC_n R^{n-1}$$

The following relationships hold between the n-spherical surface area and volume:

$$V_n/S_n = R/n$$

$$S_{n+2} V_n = 2\pi R$$

Figure 18:
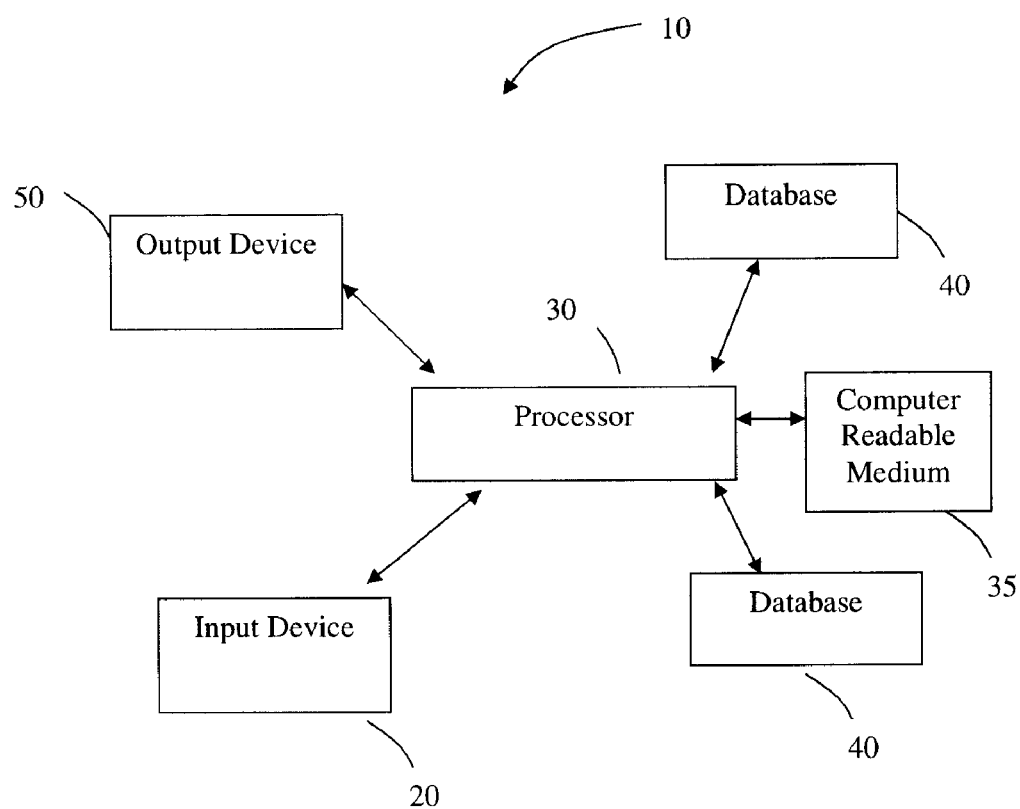
FIG. 18 shows a block diagram depicting an exemplary system configured to analyze the diversification of a portfolio.

As an alternative to the sphericty as a measure of symmetry, other measurement of symmetry may be substituted. FIG. 18 shows an embodiment of the invention using symmetry quantification.

A further embodiment of the invention can be produced by dividing the KLD obtained in step 8 by the intrinsic dimension of that portfolio. The result produces a ratio explaining the diversification level for a given set of assets, relative to the total diversification potential for those assets. This ratio would be equal to one if the KLD and the Intrinsic dimension would be equal. This value would tend towards zero as the portfolio became relatively less diversified. This is similar to the IPC metric, but effectively perfect diversification when all assets are uncorrelated, whereas the IPC interprets perfect diversification when all assets are negatively correlated.

Step 9. Publish the Diversification Value

The output of the diversification quantification process is then published to another media, such as a printer, computer display, database, external system. The output may also be combined with other values and published.

This measurement may then be conjoined with other measurements in either a time-weighted or capitalization-weighted manner. The result of which would produce a diversification measure transcending time and changes made the composition, relationships and weightings of the portfolio.

Following the method in A, it can be then augmented to exhibit the passing of time. Here time can be modeled continuously or at any interval given as an input to the system or derived from other information. With each passing of time providing a new location of each asset and its diversification.

Another output of the system can be configured to produce a chart which displays a line or area graph of the diversification metric over time. This can be applied to the same portfolio with the same weights or with varying weights.

Another output of the system can be configured to produce a chart which displays a probability distribution the diversification metric. Such a distribution may be produced using simulation or sampling techniques or historically observed.

Another output of the system can be configured to produce a chart which displays a 3D contour surface of the data displaying the diversification metric probability or confidence interval of the measure, and time.

Another output of the system can be configured to produce a chart which displays a graph of the diversification metric and the probability level.

Another output of the system can be configured to produce a tabular matrix comprised of the diversification metrics and confidence intervals.

Another output of the system can be configured to produce a chart which displays a comparative diversification metric of multiple portfolios as a radar graph.

Another output of the system can be configured to produce a chart which displays comparative diversification metric of multiple portfolios over time as line graphs.

Another output of the system can be configured to produce a chart which displays comparative diversification metrics of portfolio components as a pie chart.

Another output of the system can be configured to produce a chart which displays comparative diversification metrics of multiple portfolios as a bar graph.

Another output of the system can be configured to produce a chart which displays comparative diversification metrics of multiple portfolios as well as portfolio risk and return data as a 3D contour or surface chart.

Another output of the system can be configured to produce a chart which displays comparative diversification metrics including the KLD, KLDM, IPC, and CC.

Another output of the system can be configured to produce a chart which displays the relative diversification contribution of each portfolio asset.

Another output of the system can be configured to produce a chart which displays comparative diversification metrics of multiple portfolios, as well as assets' other fundamental metrics, such as risk, return, fees, performance ratios, valuation metrics or other forms of quantitative analysis.

Another output of the system can be configured to produce a chart which displays comparative diversification metrics of multiple portfolios where the diversification metric determines the size of the display point. The display point may be a circle, sphere, X or other object. The location of the point may be given by other metrics.

Another output of the system can be configured to produce a chart which displays the relative ranges of diversification corresponding to various confidence intervals and shows how these ranges fluctuate over time.

Another output of the system can be configured to produce a chart which displays the relative diversification metrics against a population of other portfolios and their diversification metrics.

Figure 2:
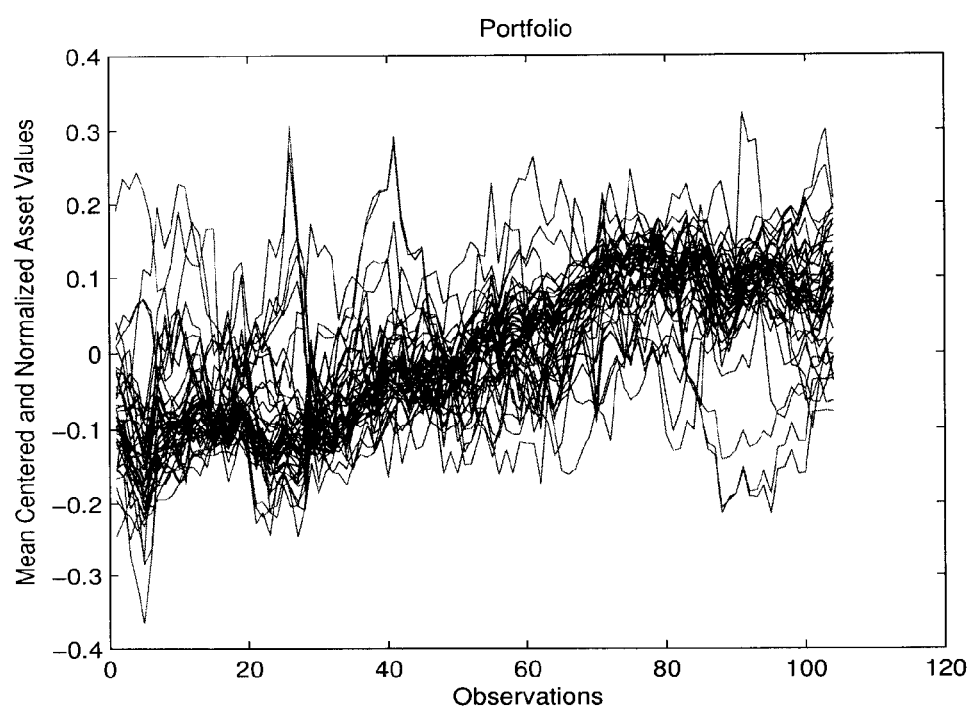
FIG. 2 shows a time series for a portfolio consisting of 45 equally weighted assets observed over 104 trading days.

Example outputs are shown in FIGS. 2-16. FIG. 2 depicts an output for an example portfolio consisting of 45 equally weighted assets observed over 104 trading days. The time series represents the rescaled caricatures of the original time series. A band of highly correlated behavior is exists as evidenced from the output.

Figure 3:
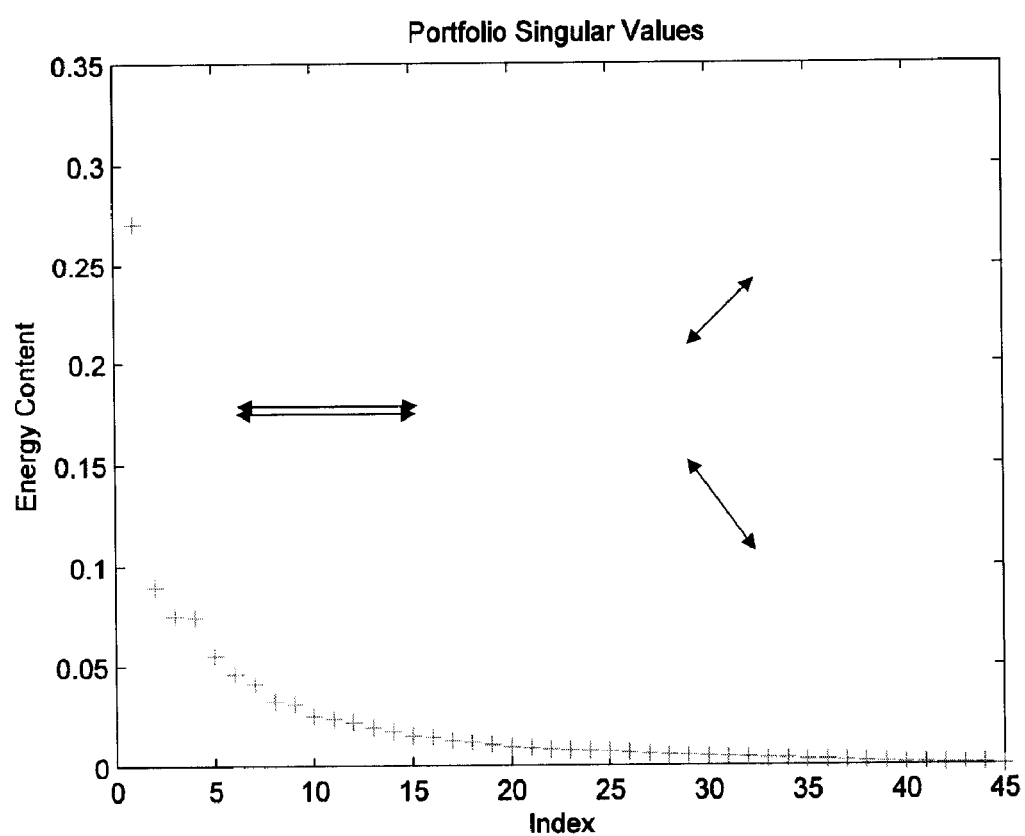
FIG. 3 shows a KL spectrum plot for the portfolio of FIG. 2.
Figure 4:
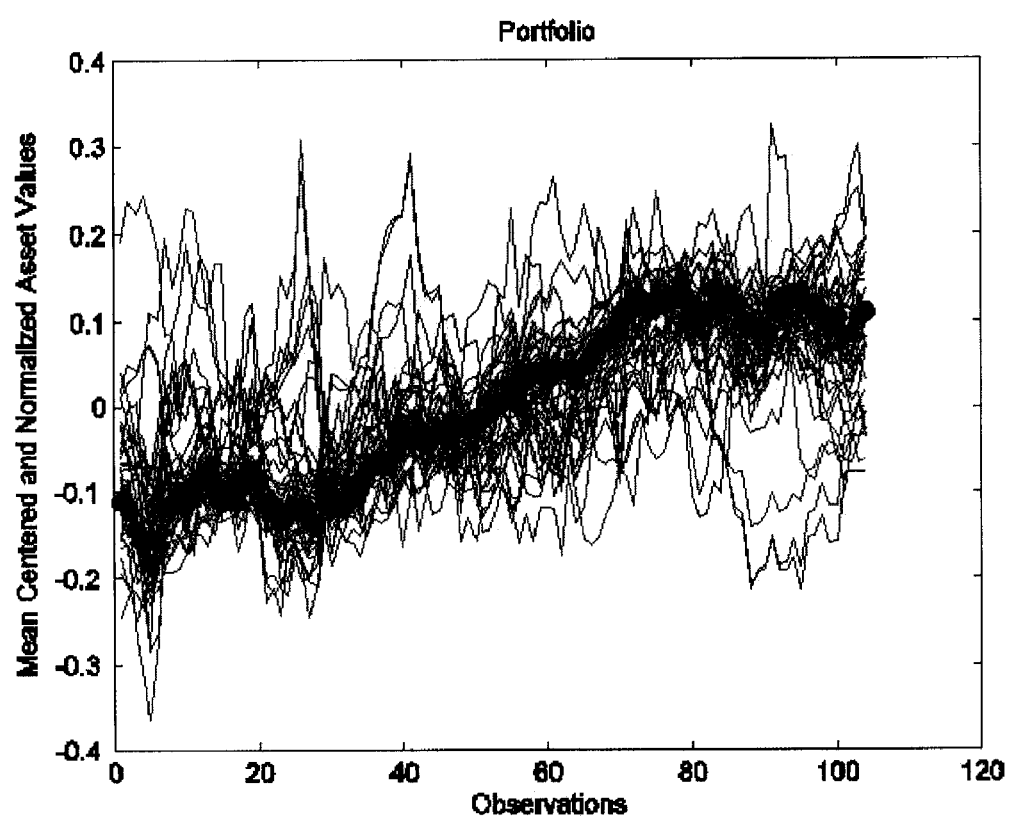
FIG. 4 shows a time series for the portfolio of FIG. 2 with the dominant eigenasset overlaid in dots.

FIG. 3 depicts a KL spectrum plot for the portfolio depicted in FIG. 2 consisting of 45 equally weighted assets observed over 104 trading days. The plot is a normalized energy plot. The largest value (far left) is about 0.28 which implies 28% of the portfolio's variance is described in the dominant eigenasset direction, 95% of the variance is captured by 27 eigenassets and the rank of the portfolio is 44 (number of nonzero singular values). FIG. 4 depicts the total portfolio from FIG. 2 with the dominant eigenasset overlaid in dots. Approximately 28% of the portfolio is explained by the performance of the dotted trend line.

Figure 5:
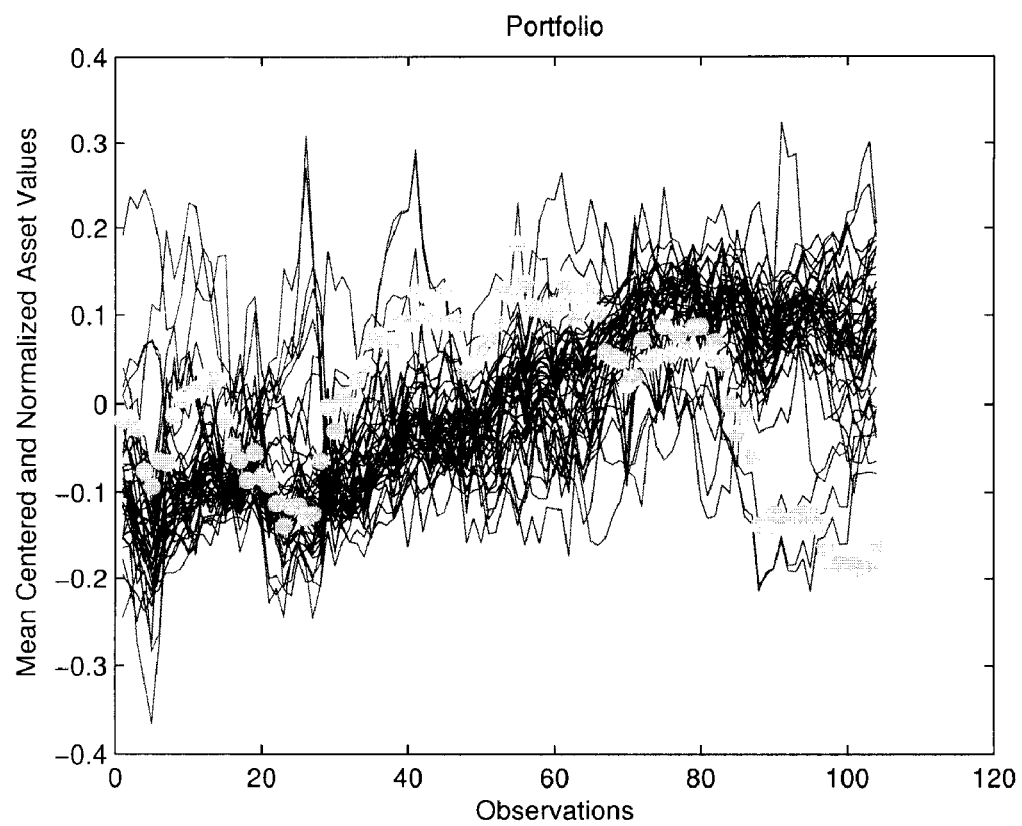
FIG. 5 shows a time series for the portfolio of FIG. 2 with the second most energetic eigenasset overlaid in the dotted line.

FIG. 5 depicts the asset allocation portfolio shown in FIG. 4 with the second most energetic eigenasset overlaid in the dotted line. Approximately 9% of the portfolio's variance is captured by the dotted trend line. Adding eigenassets' together until the sum of the variances meets the confidence interval is a way to determine the dimension.

Figure 6:
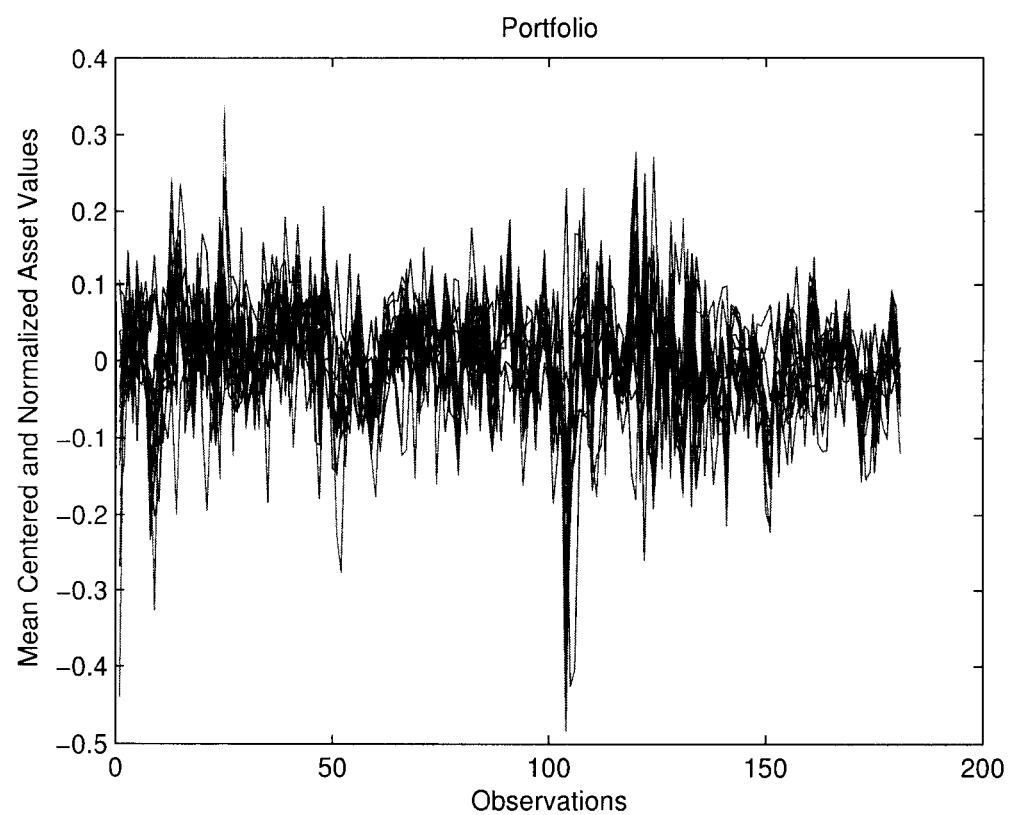
FIG. 6 shows a time series for a portfolio consisting of 17 equally weighted assets consisting of hedge fund indices observed over 181 trading periods.

To contrast the previous example, consider a new example having fewer assets. FIG. 6 depicts an asset allocation portfolio consisting of 17 equally weighted assets consisting of hedge fund indices observed over 181 trading periods. The time series represents the rescaled caricatures of the original time series. This portfolio is less diversified than the example in FIG. 2, in the sense that the KLD is lower. However, the amount of diversification relative to the portfolio's potential is greater, thus it has a greater KLDM.

Figure 7:
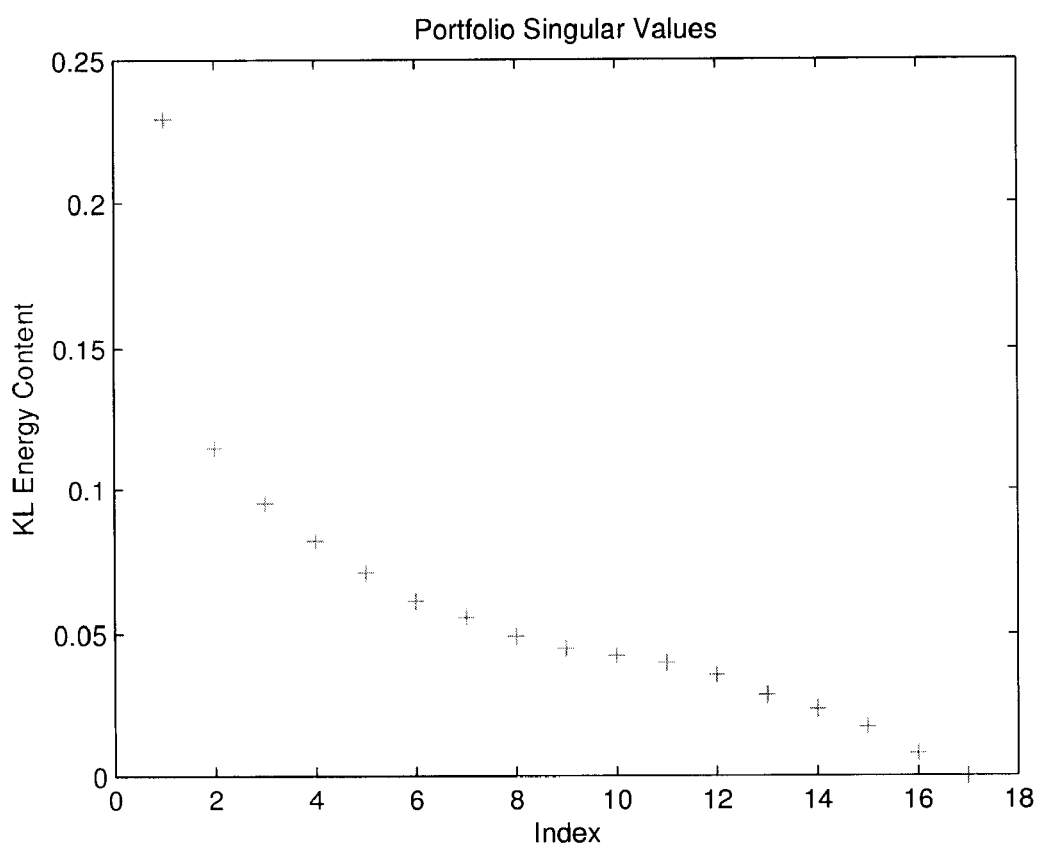
FIG. 7 shows a KL spectrum plot for the portfolio described in FIG. 6.

FIG. 7 depicts the KL spectrum plot for the hedge fund indices portfolio relating to FIG. 6 that consists of 17 equally weighted assets observed over 181 trading days. This is a normalized energy plot. The largest value is about 0.23 which implies 23% of the portfolio's variance is described in the dominant eigenasset direction, 95% of the variance is captured by 14 eigenassets and the rank of the portfolio is 16 (number of nonzero singular values).

Figure 8:
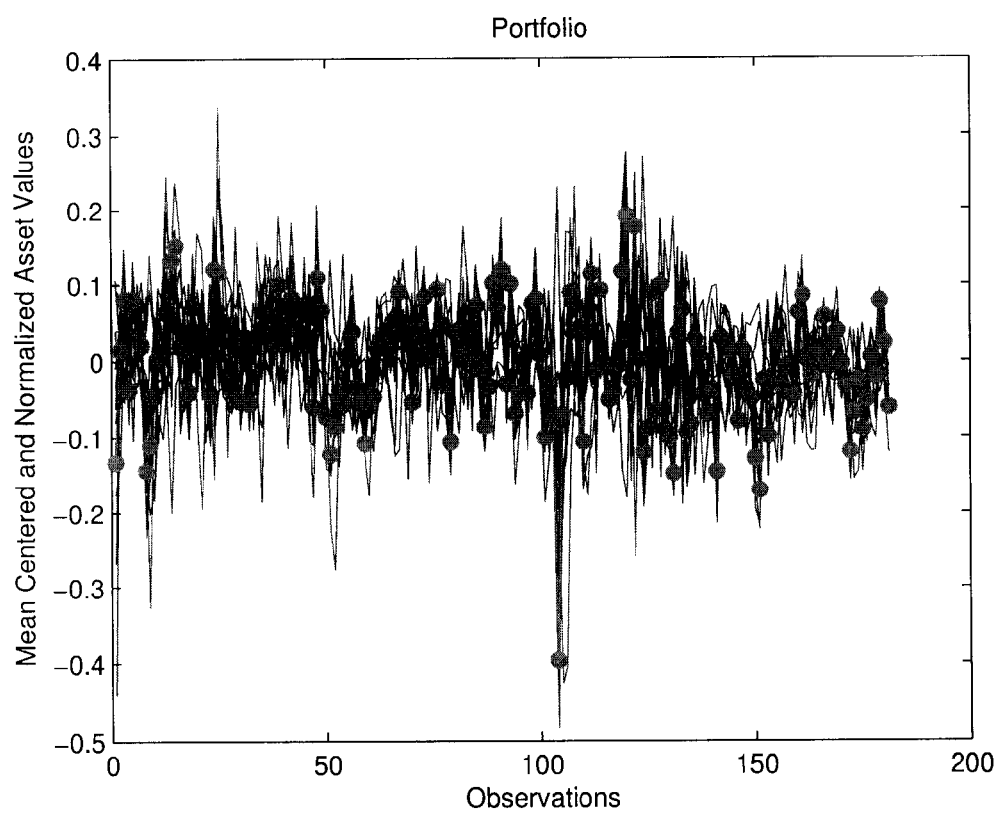
FIG. 8 shows a time series representing the resealed caricatures of the time series shown in FIG. 6.
Figure 9:
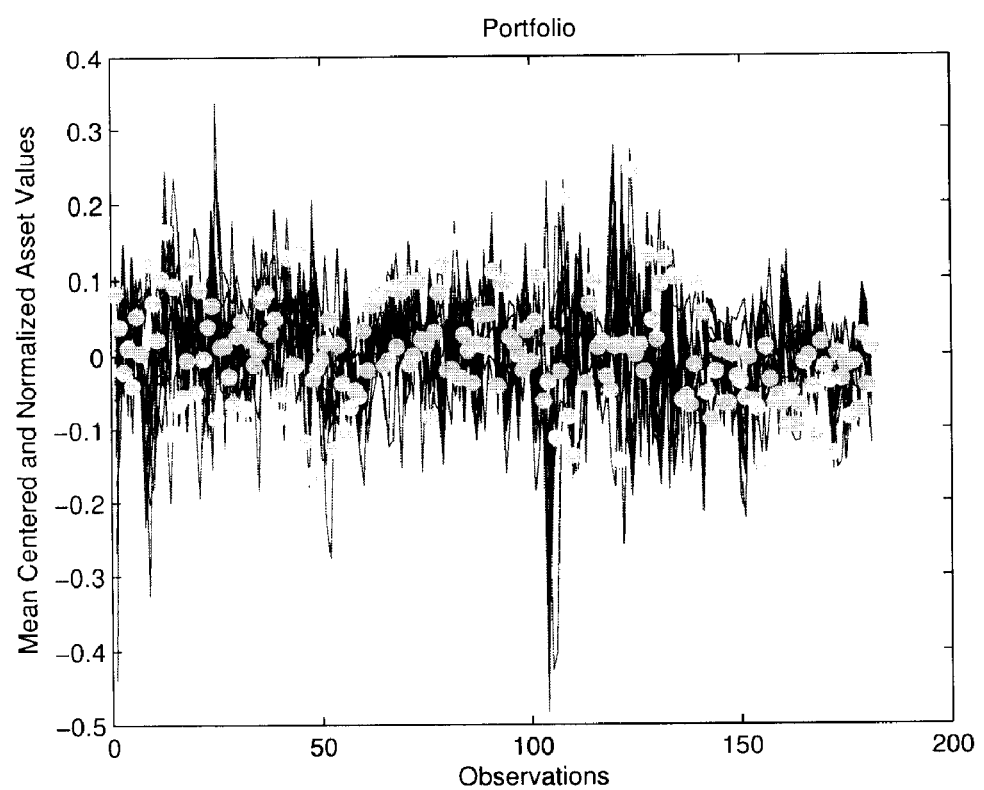
FIG. 9 shows a time series for the portfolio described in FIG. 6 with the second most energetic eigenasset overlaid in the dots.

FIG. 8 depicts the portfolio relating to FIG. 6 that consists of 17 equally weighted assets consisting of hedge fund indices observed over 181 trading days. The time series represents the rescaled caricatures of the original time series. The dominant eigenasset is overlaid in dots and contains 23% of the portfolio's variance. Whereas FIG. 9 depicts the hedge fund indices portfolio with the second most energetic eigenasset overlaid in the dots. Approximately 12% of the portfolio's variance is captured by the dotted trend line, each dot representing the periodic eigenasset.

Figure 10:
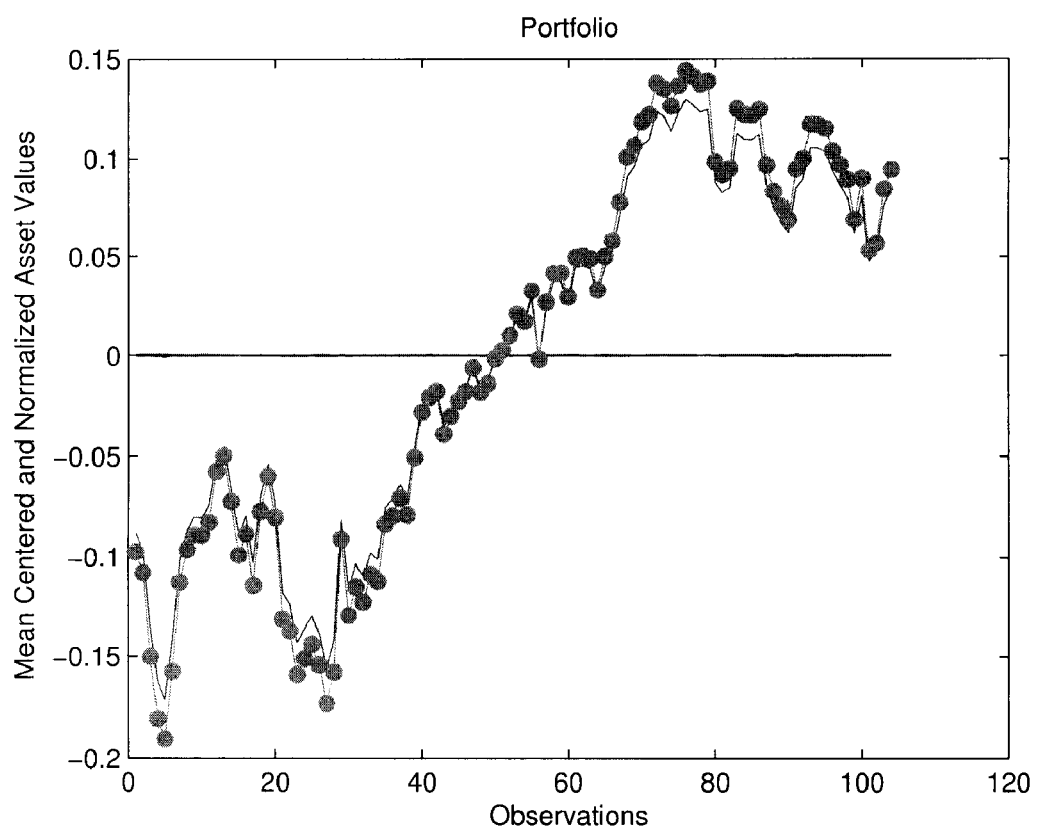
FIG. 10 shows the KL energy spectrum of the portfolio described in FIG. 2 consisting of 45 assets with 90% invested in a single asset and the remaining 10% evenly distributed among the other 44 assets.

As shown in FIG. 10, the first eigenasset contains 90% of the portfolio's resources and the remaining 10% is evenly distributed to the remaining 44 assets. This is not a diversified portfolio. This portfolio is almost 1 dimensional and the KL energy dimension confirms this intuition. FIG. 10 shows the KL energy spectrum of the weighted portfolio. A portfolio consisting of 45 assets with 90% invested in a single asset and the remaining 10% evenly distributed among the other 44 assets. The dominant eigenasset overlaid in the dotted line contains nearly 98% of the portfolio's variance. It is visually apparent that the dominant eigendirection is nearly identical to the highly weighted asset as expected.

Figure 11:
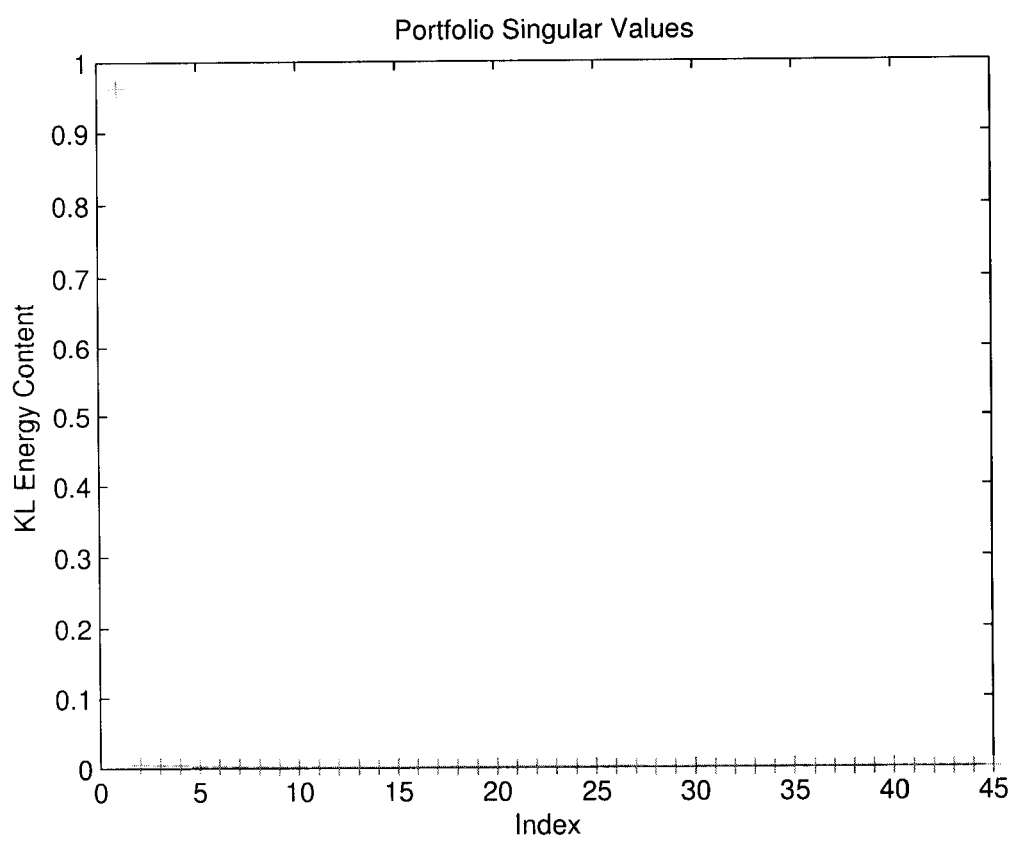
FIG. 11 shows the KL energy spectrum of the portfolio described in FIG. 2 consisting of 45 assets with 90% invested in a single asset and the remaining 10% evenly distributed among the other 44 assets.

FIG. 11 depicts a KL energy spectrum of a portfolio consisting of 45 assets with 90% invested in a single asset and the remaining 10% evenly distributed among the other 44 assets. The heavy weighting in one direction is apparent and severely reduces the KL energy dimension of the portfolio. This portfolio is 1 dimensional at the 95% confidence interval since the dominant eigenasset contains over 95% of the variance. The dominant eigenasset is shown on the far left of FIG. 11.

Figure 12:
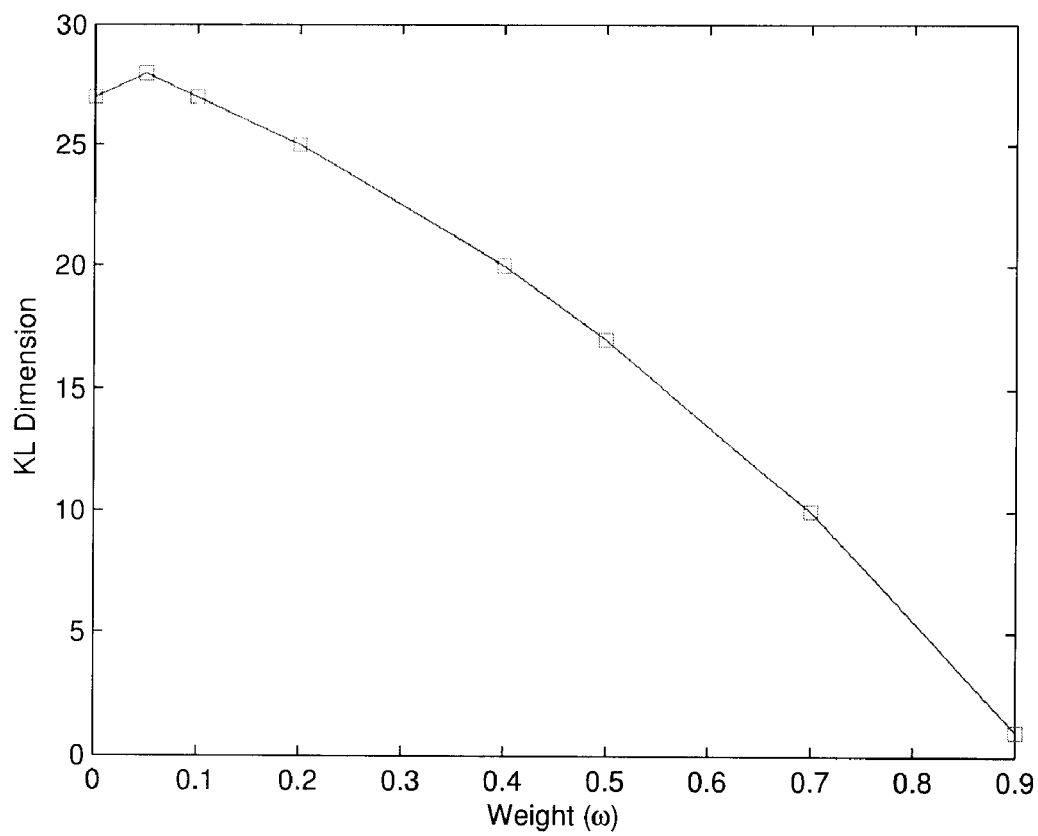
FIG. 12 shows a plot of the KL energy dimension as a function of weighting a single asset with value $\omega$ and evenly dividing the remaining $(1-\omega)$ among all other assets for the portfolio described in FIG. 2.

FIG. 12 depicts a plot of the KL energy dimension as a function of weighting a single asset with value ω and evenly dividing the remaining (1−ω) among all other assets. Computing the KL energy dimension is achieved by taking the portfolio in FIG. 2 and weighting a selected asset by ωi and then evenly allocating the remaining (1−ωi) amongst the remaining assets in the portfolio. In FIG. 12, ω=0 represents the KL dimension of an equally weighted portfolio. The initial jump shown in FIG. 12 shows where diversification is maximized for the weighting of the principal asset. For the portfolio studied here, the equally weighted portfolio has a KL energy dimension of 27. The KL energy dimension decays at a nearly linear rate with respect to weight.

Figure 13:
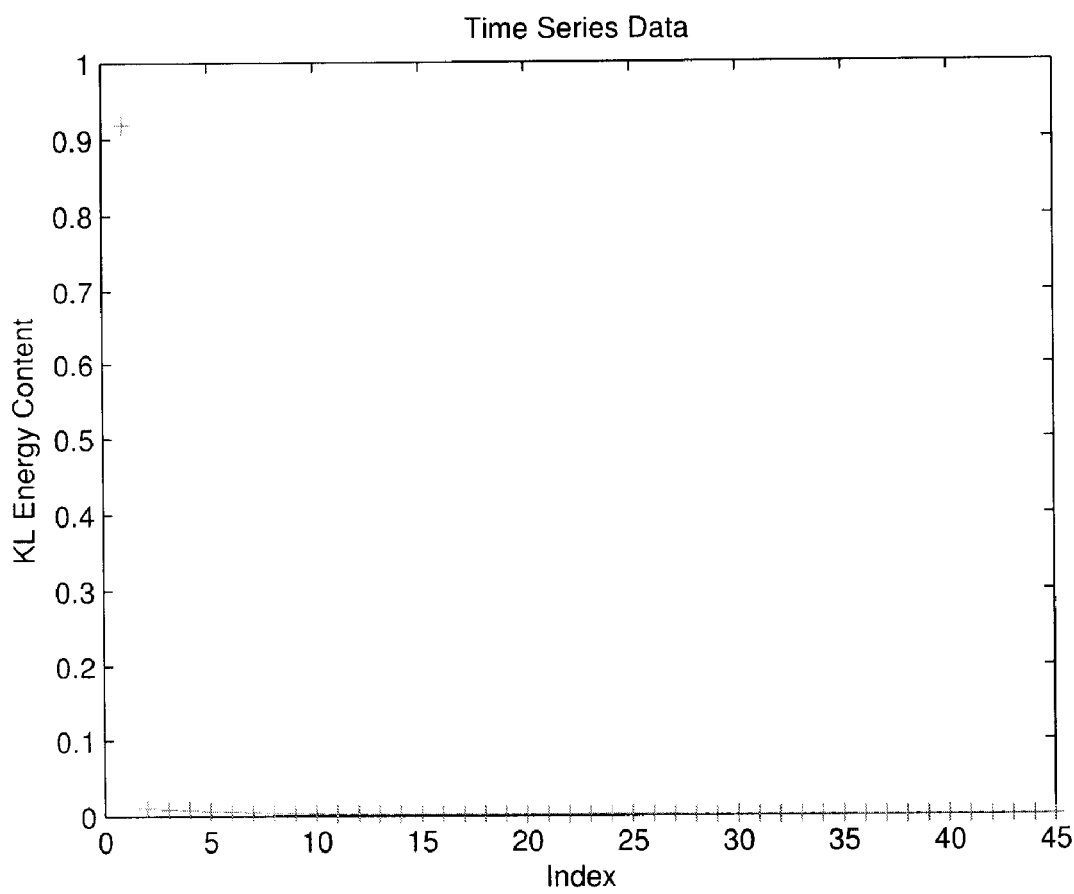
FIG. 13 shows a KL energy spectrum computed for a weighted portfolio, $\omega=0.8$ computed from time series data rather than correlations.
Figure 14:
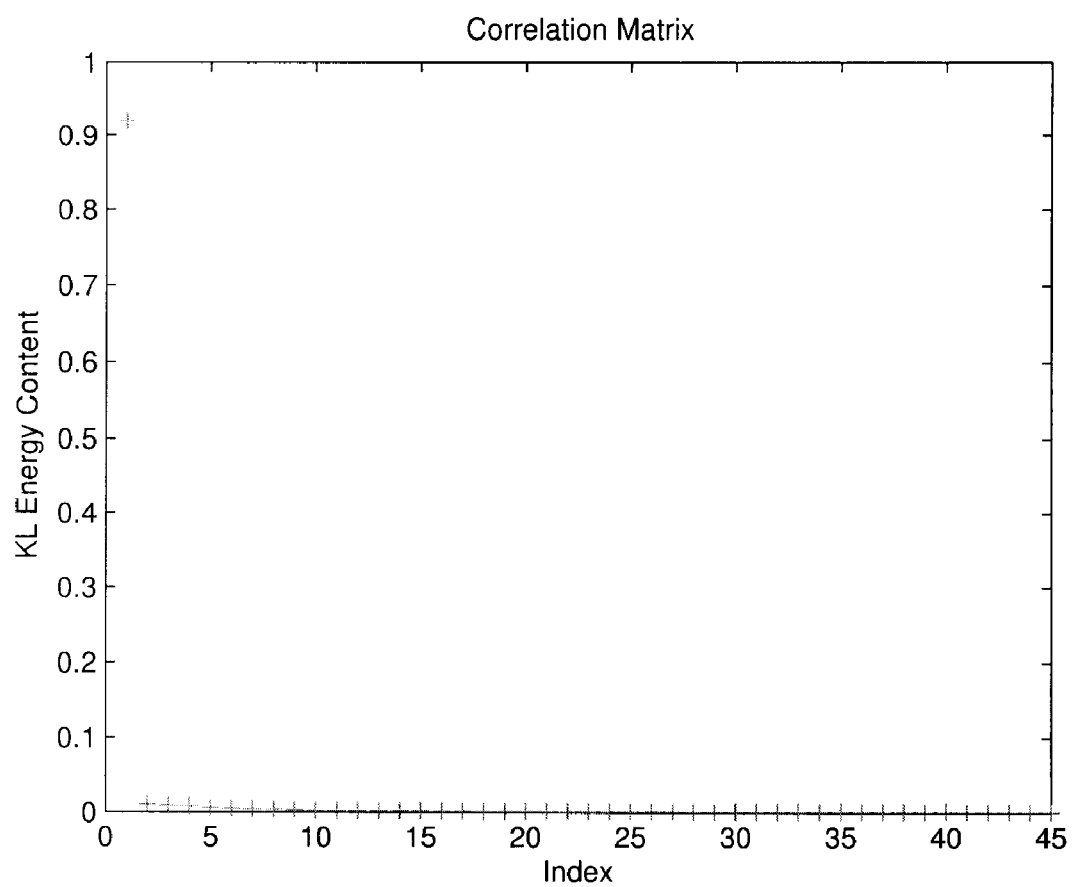
FIG. 14 shows a KL energy spectrum computed for a weighted portfolio where one asset has 80% of the investment allocated to it.

FIG. 13 depicts a KL energy spectrum computed for a weighted portfolio, ω=0.8 computed from time series data rather than correlations. The remaining 20% is evenly distributed among the other assets. FIG. 14 depicts a KL energy spectrum computed for a weighted portfolio, one asset has 80% of the investment allocated to it. The same assets and same weights are used as applied in FIG. 13 but this portfolio is built from correlations. The results are identical as those obtained directly from time series observations.

Figure 15:
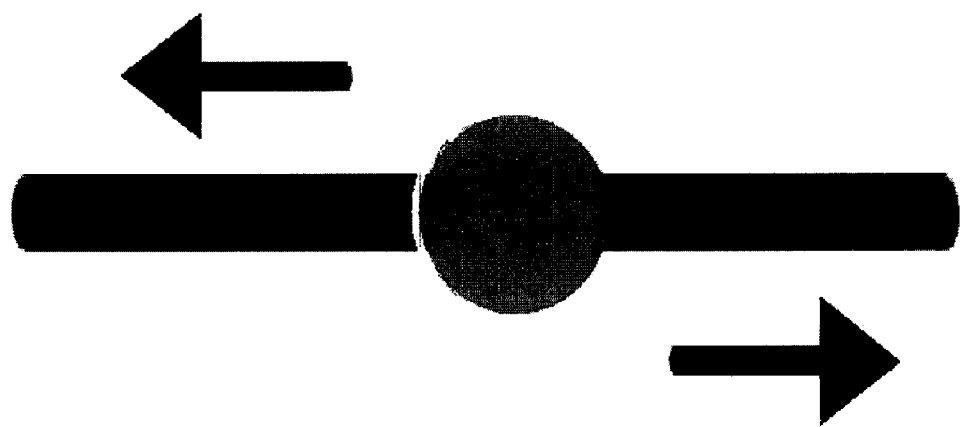
FIG. 15 shows an illustration of a one-dimensional portfolio.

While FIG. 15 depicts an illustration of a one-dimensional portfolio, FIG. 16 shows the KL energy plot of the eigenassets. Confidence intervals of 90, 95, 99 and 99.5% have been depicted.

Figure 17:
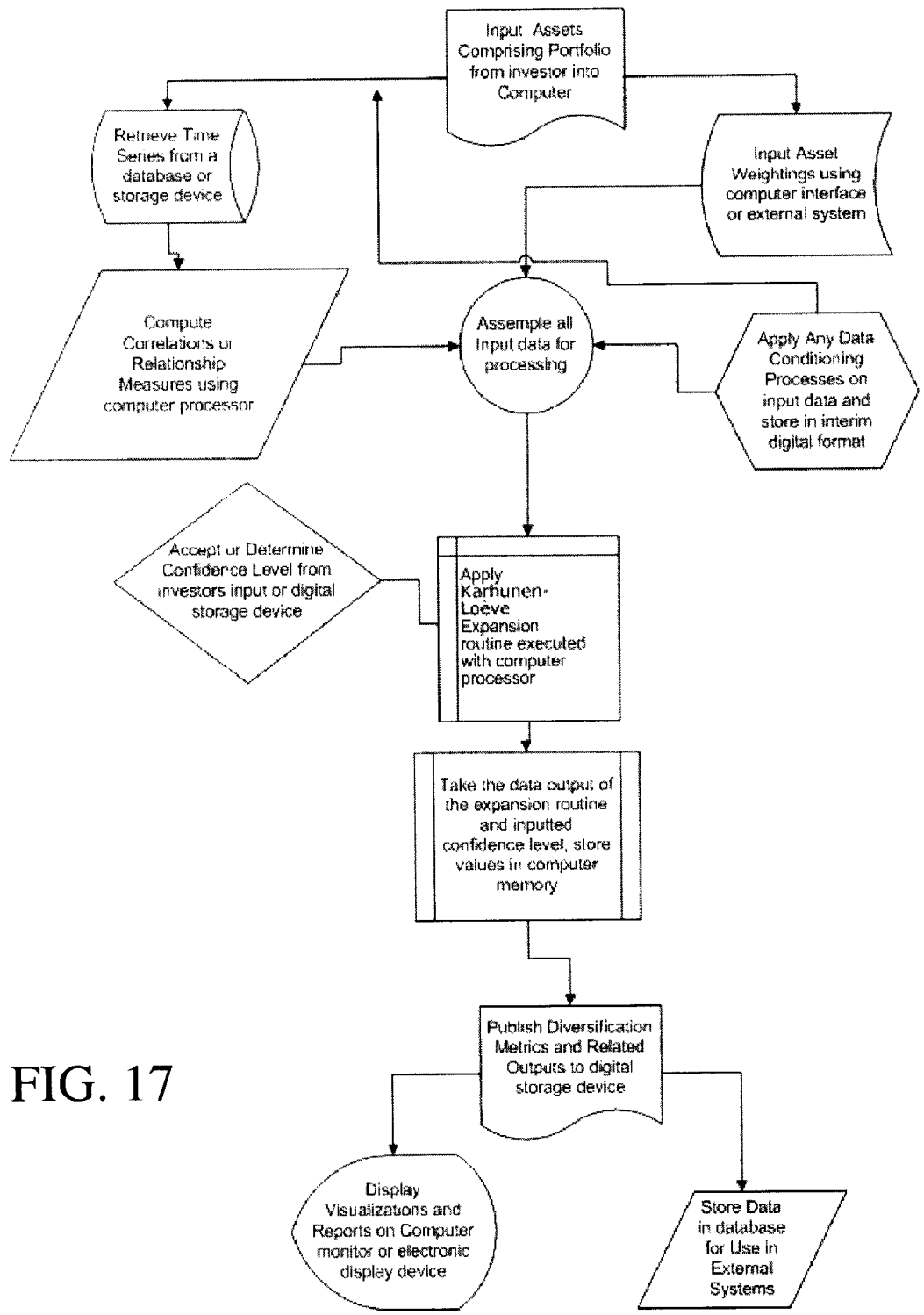
FIG. 17 shows a flow diagram for an exemplary process relating to analyzing the diversification of a portfolio.

FIG. 17 shows a process flow diagram of the invention executed on a system such as that shown in FIG. 18 wherein system (10) includes an input device (20) in communication with a processor (30). Processor (30) is operatively connected with a computer readable medium (35).

The term "computer readable medium" should be read broadly to include any object, substance, or combination of objects or substances, capable of storing data or instructions in a form in which they can be retrieved and/or processed by a device. A computer readable medium should not be limited to any particular type or organization, and should be understood to include distributed and decentralized systems however they are physically or logically disposed, as well as storage objects of systems which are located in a defined and/or circumscribed physical and/or logical space.

When used in the claims, "operatively connected" may be understood to refer to a relationship where a thing is able to control or influence the operation of the thing to which it is connected. Examples to illustrate the meaning of "operatively connected" include a processor operatively connected to a computer-readable medium (where the medium stores instructions which can control the tasks performed by the processor), a printer operatively connected to a server (for example, where a server communicates over a network with a printer to indicate what should be printed), and a monitor operatively connected to a program (where the program might control, perhaps in combination with a medium and a processor, what is displayed on the monitor).

As shown in FIG. 17, an investor may input asset data to create a portfolio. This may be achieved in a variety of ways including for example using an input device (20) having a user interface. An exemplary user interface may be understood to refer to one or more tools which allows a user to interact with an automated system. However, any suitable user interface may be used that allows a user to input assets into a portfolio.

Several events occur after the portfolio is in existence including the retrieval of a time series from a database or storage device. Correlations or relationship measures are then also computed using a processor (30). Any suitable technique may be used for computing correlations and relationship measures including those described earlier in "Step 3. Obtain or create a relationship measure for the assets." The verb "retrieve" (and the various forms thereof) when used in the context of data should be understood to mean reading the data "retrieved" from a location in which that data is stored, including for example a database (40). Database may be understood to refer to an organized collection of data. Similarly, a "data source" may be understood to refer to a computer-readable data structure for storing a collection of data including, but not limited to, databases, data warehouses and datamarts.

Likewise, any suitable processor may be used. For example, a processor may include a component integrated into a computer, which performs calculations, logical operations, and other manipulations of data. A computer may be understood to refer to a device or group of devices which is capable of performing one or more logical and/or physical operations on data to produce a result. Computer executable instructions may be understood to refer to data, whether stored as hardware, software, firmware, or some other manner, which can be used to specify physical or logical operations to be performed by a computer or processor.

Also occurring after a portfolio is in existence, asset weightings may be inputted using for example an input device (20) that may or may not be the same as the device used to create the portfolio. Any suitable device or technique may be used to input data into the system. The input of data may be automatic or manual including the input of asset weightings. The term "data" should be understood to mean information which is represented in a form which is capable of being processed, stored and/or transmitted. Hence, data would include but not be limited to asset information, time series information, asset weightings, data conditioning process information, and so on. Any suitable technique may be used for weighing assets including those described earlier under "Step 2. Apply any weighing to assets." Likewise, any suitable technique may be used for applying any condition systems including those described earlier in "Step 5. Apply any condition systems."

In the example shown in FIG. 17, all of the input data is assembled for processing wherein processing includes modeling the data as required for calculations. The data may be modeled in vector space using any suitable technique including those described earlier in "Step 6. Model the data in vector space." For this example, input data would include but not be limited to correlations, relationship measures, asset data, asset weightings, data condition process information.

After the data is assembled, the KL expansion routine is applied as executed by processor (30). Processor (30) may also accept or determine a confidence level based on the investors input or a database (40). Any suitable technique may be used to apply the KL expansion including those described earlier in "Step 7. Apply the KL expansion process." Any suitable technique may be used to determine a confidence level including those described earlier in "Step 4. Obtain or create a confidence interval."

After the KL expansion is applied, processor (30) calculates the KL dimension. Any suitable technique may be used to calculate the KL dimension including those described earlier in "Step 8. Calculate the Karhunen-Loeve Dimension." The output of the diversification quantification process is then sent to a database (40). Any suitable output may be sent including a chart, tabular matrix including those described earlier in "Step 9. Publish the diversification value." Visualizations, reports, etc. may then be displayed including for example on the user interface of an input device (20). The visualizations, reports, etc. may be displayed on an output device (50). The output device may be understood to mean a device which presents data to a user. Examples of output devices include monitors (which present data in a visual form), and speakers (which present data in auditory form). Any suitable output device may be used that displays data to a user. The output data will remain stored in a database (40) for use by external systems.

FIG. 19 shows a process flow diagram of the invention using symmetry quantification as an alternative embodiment. The numbers associated with the flow diagram are not necessarily indicative of any particular order in which the process occurs. As shown, a determination of a portfolio is made where the portfolio includes more than one asset. Any suitable system, technique, or structure may be used to make this determination. For example, a user may utilize a user interface through an input device (20) to create a portfolio. An automated system may applied that creates a portfolio. After the portfolio is in existence, asset weightings may be applied. Likewise, relationship measures may be created or obtained. Similar to the creation of the portfolio, the application of asset weightings and relationship measures may be automatic or manual, or a combination of both. With respect to the relationship measures and asset weightings, data condition processes may be applied to each as well.

The assets may then be modeled in vector space by a processor (30) after applying the asset weightings and relationship measures. Further, a polytope representation of the portfolio may be created based in part on accepting or determining a confidence level. Once the representation is complete, the portfolio symmetry is calculated. The diversification metrics and other related outputs are then made available based on the calculated portfolio symmetry. The output data may be displayed on an output device (50).

A further embodiment of the inventions calculates a composite diversification metric. Such a diversification metric may either treat a portfolio of assets as a single asset, or reach inside and create a composite of the individual assets depending on the investor selection or business process.

It is an embodiment of the invention to perform a diversification search. In this embodiment, steps 1 and or 2 are iterated with changes made to the assets or weights. A diversification search, may represent a process wherein an investor seeking to add diversification to a portfolio may query a universe of investment candidates and rank the result in order to learn which assets provide incrementally more diversification to a portfolio. A diversification search is therefore useful to help investor change and improve a portfolio. The search may be performed by calculating the KL dimension for the portfolio and iteratively add assets, recalculate the KL dimension. Assets are then arranged by how they affect the overall dimension. This process can be readily adapted to account for asset weighted by multiplying the asset by the weight in the manner described in step 2. The process may also be adapted by multiplying the assets by a utility function. Standard optimization processes such as gradient searches, linear programming and evolutionary search can replace the iterative cycle to improve performance.

If we use a utility function instead of a weight array, then compute, then we re-compute without the utility function the difference in the SVD could explain an optimal step It is further an embodiment of the invention that an investor could designate a certain quantity of assets to invest in. Otherwise, such a portfolio constraint may be arrived at with an exogenous system. With such a criteria in place, the iterative search feature described in the prior paragraph may also be looped until a constraint is reached. Additionally if the investor selected a preference for more or less quantity of holdings then they could arrive at the diversification level by summing the energy levels of the assets from largest to smallest or smallest allocation weight to largest weight until the designated diversification measurement was ascertained.

An alternative method to publish the results would display the diversification metrics relative to the individual assets, rather than the portfolio.

Once a portfolio has been processed and diversification metrics acquired, it is possible to attribute the amount of portfolio diversification to the various assets, factors, periods or statistical categories. The invention can be iterated with each asset removed or the weight set to zero, in such a process the new KLD measurements can be related to the original KLD value and the difference attributed to the asset that was changed and then the difference may be divided the total portfolio dimensionality. This fraction helps investors understand how any asset may affect diversification.

Most rudimentary is a process to determine the amount of diversification given to an asset. For example, given a 9 dimensional portfolio comprised of 20 equally weighted assets, we know that asset G which has 5% of the total allocation weight. Using the attribution process, an investor could learn that asset G adds 1 dimension to the portfolio giving it an attribution of $1/9=11.11\%$.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, ratios, steps, and the like discussed above are illustrative and are not required. Accordingly, the scope of the present invention should be considered in terms of the following claims and is understood not to be limited to the details of structure and operation shown and described in the specification and drawings.

What is claimed is:

1. A system for measuring the diversification of a portfolio comprising:
a computer processor;
wherein said processor:
  (i) receives, as input, a portfolio comprising a plurality of assets;
  (ii) weights each of the plurality of assets within the portfolio according to an investment value allocated to each of said assets;
  (iii) defines a relationship between each of the plurality of assets by correlating each of the plurality of assets within the portfolio;
  (iv) models the portfolio in a geometric space by stretching a vector length associated with each of said plurality of assets in the portfolio in proportion to its concentration and contribution to the portfolio while retaining a set of orientations associated with said correlating step;
  (v) determines a polytope based on the modeling step associated with the portfolio; and
  (vi) compares said polytope to a symmetrical model to determine a diversification value;
wherein the polytope represents the portfolio whose assets are associated with the vector lengths which are stretched in the modeling step.

2. The system of claim 1, wherein comparing the polytope to a symmetrical model to determine a diversification value comprises calculating a sphericity value for the polytope.

3. A method comprising:
a) receiving a portfolio defined by a set of asset data input through an input device, wherein the portfolio defined by the set of asset data comprises a plurality of assets;
b) performing a step taken from a set of steps consisting of:
  i) computing relationships within the set of asset data;
  ii) receiving relationships within the set of asset data;
c) weighting each of the plurality of assets within the portfolio according to an investment value allocated to each of said assets;
d) modeling the portfolio in a geometric space with vectors representing each of the plurality of assets, the vectors having lengths stretched based on the weights for each of the plurality of assets;
e) via a processor, applying a Karhunen-Loève expansion process to the portfolio;
f) determining a dimension of the portfolio based on applying the Karhunen-Loève expansion process; and
g) determining a diversification value for the portfolio based on the determined dimension for the portfolio.

4. The method of claim 3, wherein the diversification value for the portfolio is the ratio of a Karhunen-Loève dimension for the portfolio and the spanning dimension of the portfolio.

5. The method of claim 3, further comprising publishing the diversification value.

6. The method of claim 5, wherein publishing the diversification value comprises storing the diversification value for use by other systems.

7. The method of claim 3, further comprising analyzing the portfolio based on the Karhunen-Loève dimension spectrum.

8. The method of claim 3, wherein the diversification value for the portfolio is a count of rank ordered eigenassets commensurate with an inputted interval.

9. The method of claim 3 further comprising scoring diversification of systemic risks by determining a percentage of portfolio energy content consumed within a first numbered dimension.

10. The method of claim 3, further comprising scoring diversification of systemic risks by evaluating the Karhunen-Loève dimension spectrum.

11. The method of claim 3, wherein determining the diversification value for the portfolio comprises analyzing systemic risk by evaluating a ratio of two Karhunen-Loève dimensions taken at two different confidence intervals.

* * * * *